(12) United States Patent
Chu et al.

(10) Patent No.: US 9,010,547 B2
(45) Date of Patent: Apr. 21, 2015

(54) HIGH FLUX FLUID SEPARATION MEMBRANES COMPRISING A CELLULOSE OR CELLULOSE DERIVATIVE LAYER

(75) Inventors: Benjamin Chu, Setauket, NY (US); Benjamin S. Hsiao, Setauket, NY (US); Hongyang Ma, Port Jefferson, NY (US)

(73) Assignee: The Research Foundation of State University of New York, Albany, NY (US)

( * ) Notice: Subject to any disclaimer, the term of this patent is extended or adjusted under 35 U.S.C. 154(b) by 716 days.

(21) Appl. No.: 12/126,732

(22) Filed: May 23, 2008

(65) Prior Publication Data

US 2009/0078640 A1    Mar. 26, 2009

Related U.S. Application Data

(60) Provisional application No. 60/931,765, filed on May 26, 2007, provisional application No. 60/947,045, filed on Jun. 29, 2007.

(51) Int. Cl.
*B01D 71/10* (2006.01)
*B01D 71/12* (2006.01)
*B01D 69/12* (2006.01)
(Continued)

(52) U.S. Cl.
CPC ............ *B01D 71/10* (2013.01); *B01D 67/0013* (2013.01); *B01D 69/02* (2013.01); *B01D 69/12* (2013.01); *B01D 71/12* (2013.01);
(Continued)

(58) Field of Classification Search
CPC ........ B01D 69/02; B01D 69/10; B01D 69/12; B01D 69/122; B01D 69/125; B01D 71/12; B01D 71/14; B01D 71/16; B01D 2325/04

USPC ............... 210/500.29–500.32, 503, 504, 505, 210/506, 507, 508, 500.1, 500.21, 500.26, 210/500.27, 500.38, 501, 502.1
See application file for complete search history.

(56) References Cited

U.S. PATENT DOCUMENTS 3,883,626 A * 5/1975 Kamide et al. ................. 264/49
4,242,208 A * 12/1980 Kawaguchi et al. ...... 210/500.28
(Continued)

FOREIGN PATENT DOCUMENTS

WO   WO 03015902 A2 *  2/2003
WO   WO 2007/001405      1/2007
WO   WO 2008060675 A2 *  5/2008

OTHER PUBLICATIONS

Yasuda et al., Permeabilities of Coagulated Cellulose Acetate Dialysis Membranes, 1971, John Wiley and Sons Inc., Journal of Applied Polymer Science, vol. 15, pp. 2841-2853.*

(Continued)

*Primary Examiner* — David C Mellon
(74) *Attorney, Agent, or Firm* — Carter DeLuca Farrell & Schmidt LLP

(57) ABSTRACT

The present invention provides membranes having a coating layer comprising cellulose or cellulose derivative and a porous support comprising nanofibers prepared by a process of coating a solution comprising cellulose or a cellulose derivative dissolved in an ionic liquid on to a porous support layer. The present invention is useful for providing improved water flux and high rejection rates for oil/water emulsions. The present invention also provides fluid separation systems in UF, NF, RO and FO, incorporating membranes of the present invention.

20 Claims, 17 Drawing Sheets

(51) Int. Cl.
*B01D 67/00* (2006.01)
*B01D 69/02* (2006.01)

(52) U.S. Cl.
CPC ......... *B01D2323/42* (2013.01); *B01D 2325/20* (2013.01); *B01D 2323/39* (2013.01)

(56) References Cited

U.S. PATENT DOCUMENTS

| | | | |
|---|---|---|---|
| 4,333,972 A | | 6/1982 | Kesting |
| 5,049,167 A | | 9/1991 | Castro et al. |
| 5,702,503 A | * | 12/1997 | Tse Tang ........................ 95/45 |
| 6,162,358 A | | 12/2000 | Li et al. |
| 6,536,605 B2 | | 3/2003 | Rice et al. |
| 6,824,599 B2 | * | 11/2004 | Swatloski et al. ....... 106/163.01 |
| 7,090,712 B2 | | 8/2006 | Gillingham et al. |
| 7,090,715 B2 | * | 8/2006 | Chung et al. ................... 55/528 |
| 2002/0014182 A1 | | 2/2002 | Yadav et al. |
| 2004/0038014 A1 | * | 2/2004 | Schaefer et al. ............. 428/220 |
| 2006/0049102 A1 | | 3/2006 | Miller et al. |
| 2006/0213829 A1 | * | 9/2006 | Rutledge et al. ............. 210/503 |
| 2007/0125703 A1 | * | 6/2007 | Chapman et al. ............. 210/504 |
| 2007/0151921 A1 | * | 7/2007 | Nakano et al. ........... 210/500.21 |
| 2008/0149561 A1 | * | 6/2008 | Chu et al. ................. 210/500.38 |

OTHER PUBLICATIONS

International Search Report from International Application No. PCT/US08/64768 dated Feb. 5, 2009.

Young, "International Search Report," 2 pages, from International Patent Application No. PCT/US07/86549 (mailed Sep. 17, 2008).

Saravanababu Murugesan et al: "Ionic liquid-derived blood-compatible composite membranes for kidney dialysis", Journal of Biomedical Materials Research. Part B: Applied Biomaterials, John Wiley & Sons, Hoboken, NJ, US, vol. 79b, Apr. 24, 2006, pp. 298-304, XP002494016.

Extended European Search Report corresponding to EP Appl. No. 08827640.7 dated May 2, 2012.

* cited by examiner

US 9,010,547 B2

HIGH FLUX FLUID SEPARATION MEMBRANES COMPRISING A CELLULOSE OR CELLULOSE DERIVATIVE LAYER

CROSS-REFERENCE TO RELATED APPLICATIONS

This application claims the benefit of U.S. Provisional Patent Application No. 60/931,765 filed May 26, 2007, and U.S. Provisional Patent Application No. 60/947,045 filed Jun. 29, 2007, the entire disclosures of which are both herein incorporated by reference in their entirety for all purposes.

GOVERNMENT RIGHTS

This invention was made with Government support under the Office of Naval Research, grant number N000140310932. The Government has certain rights in the invention.

FIELD OF THE INVENTION

The present invention relates to a simple method for preparing cellulose and cellulose derivative composite membranes having improved permeation flux properties. The membranes of the present invention are useful as fluid separation membranes such as ultrafiltration membranes, nanofiltration membranes, reverse osmosis membranes, and forward osmosis membranes.

BACKGROUND OF THE INVENTION

Cellulose is an abundant, renewable, low cost bio-material. However, the poor solubility of cellulose in common organic solvents significantly limits its utilization in many applications because of processing difficulties. However, recently several studies have reported the chemical modification of cellulose (e.g. acylation, carbanilation, etc.), dissolved in solutions of ionic solvents.

Cellulose derivatives such as cellulose acetate, cellulose diacetate and cellulose triacetate have been used to prepare commercial reverse osmosis membranes by phase inversion methods. However, such membranes have various problems attributable to the membrane structure. For example, in order to provide commercially useful filtration rates, high operating pressures (up to 1 MPa) must be used, which increases energy costs and results in a loss of separation performance and mechanical breakage of the membrane due to compaction and densification of the membrane during the filtration process. Membranes with thinner dense layers have been prepared in order to increase the flux rate, but such membranes are prone to breakage even at low pressure.

Compared to cellulose derivatives such as cellulose acetate, cellulose membranes offer improved properties because of their excellent chemical stability, biocompatibility, and environmental friendliness. Cellulose ultrafiltration (UF) membranes have been prepared e.g. by hydrolyzing conventional phase inversion cellulose acetate membranes in strong basic solutions such as aqueous sodium hydroxide. This process is relatively complex and expensive, and the organic solvents (e.g. NMP) used to prepare the phase inversion membrane and the corrosive base solutions are not environmentally friendly and are toxic and/or hazardous to use.

Most commercial reverse osmosis (RO) membranes currently used for desalination are composite membranes made by an interfacial polymerization process. Typically, a microporous membrane (e.g., a polysulfone UF membrane) is first soaked in an amine solution. The aromatic amine-wetted UF membrane support is then contacted with one or more crosslinking agents dissolved in an immiscible organic solvent(s) (e.g., trimesoyl chloride in hexane). At the interface of the two immiscible liquids, a dense, crosslinked, and charged polymeric network is formed. Such interfacially polymerized top coating layers typically have a thickness of ~0.002 to ~0.3 µm. Current commercial RO membranes have the sodium chloride rejection rate of 99+% and a water flux greater than 35 L/m$^2$h at a feed pressure of 800 psi.

The majority of commercially available nanofiltration (NF) membranes are also prepared by interfacial polymerization, e.g., comprising a piperazineamide on a microporous substrate. For example, Cadotte et al. (U.S. Pat. No. 4,259,183, herein incorporated by reference in its entirety for all purposes) has successfully demonstrated the fabrication of NF membranes by the interfacial polymerization of piperazine using trimesoyl chloride. These composite nanofiltration membranes exhibited very high $MgSO_4$ rejection rate (99%) but low NaCl retention rate (<60%). Multi-component (piperazine and polyvinyl alcohol, JP 61 93,806; herein incorporated by reference in its entirety for all purposes) and multilayer coating (sulfonated polysulfone and piperazineamide) composite membranes have also been prepared. For typical nanofiltration membranes, the molecular weight cutoff ranges are from 100 to 5000 Dalton, with a high rejection of divalent ions (>99%) and low rejection of monovalent ions (~50% or less).

Composite UF membranes have also been prepared by interfacial polymerization. Wrasidlo et al (U.S. Pat. No. 4,902,424, herein incorporated by reference in its entirety for all purposes) prepared composite UF membranes by the interfacial polymerization of a polyethyleneimine-soaked microporous membrane with isophthaloyl chloride and toluene diisocyanate in hexane. The polymerized top coating layer had a thickness ranging from 0.0012 to 0.15 µm, with molecular weight cutoff values ranging from 500 to 1,000,000 Dalton. Stengaard et al (J. Membr. Sci., 53 (1990) 189-202; herein incorporated by reference in its entirety for all purposes) reported reacting an undisclosed aqueous monomer composition with diisocyanates on polyethersulfone UF membranes (MWCO: 20 k~50 k Dalton). Separation of whey/skimmed milk mixtures were carried out, with a permeate flux ranging from 40~75 L/m$^2$h at 30~60 psi.

However, a major drawback in conventional composite membranes prepared by interfacial polymerization processes is pore blockage in the microporous membrane support when it is soaked in aqueous amine solutions. The blocked pores tend to increase the effective coating thickness of the interfacially polymerized coating layer, and consequently tend to decrease the permeate flux. Also, the chemical nature of polyamide coating (e.g. hydrolyzed acyl halide; carboxylate groups and terminating amine groups), make interfacially polyamide composite membranes more prone to fouling by charged solute species, which also tends to significantly reduce the permeate flux. Typically, before the use of interfacially polymerized polyamide coated membrane in the final step of filtration (NF and RO), the feed solution must be pre-filtered by microfiltration and ultrafiltration in order to keep a stable flux rate without significant fouling. Another drawback in the preparation of the conventional composite membranes is the use of volatile organic solvents and corrosive base solutions for the hydrolysis of cellulose esters in organic solvents.

Thus, there is a need for high-flux UF, NF, forward osmosis (FO) and RO membranes having a high permeation rate, high rejection ratio, reduced fouling rate prepared using an environmentally benign process compared to filtration membranes currently available on the market today. The cellulose composite membranes prepared by the process of the present invention provide improved properties and are easily prepared using environmentally friendly solvents.

SUMMARY OF THE INVENTION

In one embodiment, the present invention is directed to a membrane comprising a coating layer comprising cellulose or a cellulose derivative and a porous support layer, prepared by a process comprising coating a solution comprising cellulose or a cellulose derivative dissolved in an ionic liquid onto a porous support layer, and removing the ionic liquid.

In another embodiment, the present invention is directed to a membrane module comprising at least one cellulose or cellulose derivative membrane of the invention, as described herein, means for contacting a fluid mixture with the surface of the cellulose coating of the at least one membrane; and means for removing a retentate from the surface of the cellulose coating opposite the surface of the porous support contacting the cellulose coating layer.

In still another embodiment, the present invention is directed to a fluid separation system comprising at least one membrane module as described herein.

In yet another embodiment, the present invention is directed to a method of making a membrane of the present invention comprising the steps of (a) preparing a porous support comprising nanofibers; (b) preparing a solution comprising cellulose or a cellulose derivative and an ionic liquid; (c) adding the cellulose or cellulose derivative solution of (b) on one side of the porous support; and (d) removing excess solution comprising cellulose from the membrane.

DETAILED DESCRIPTION OF THE INVENTION

Figure 1:
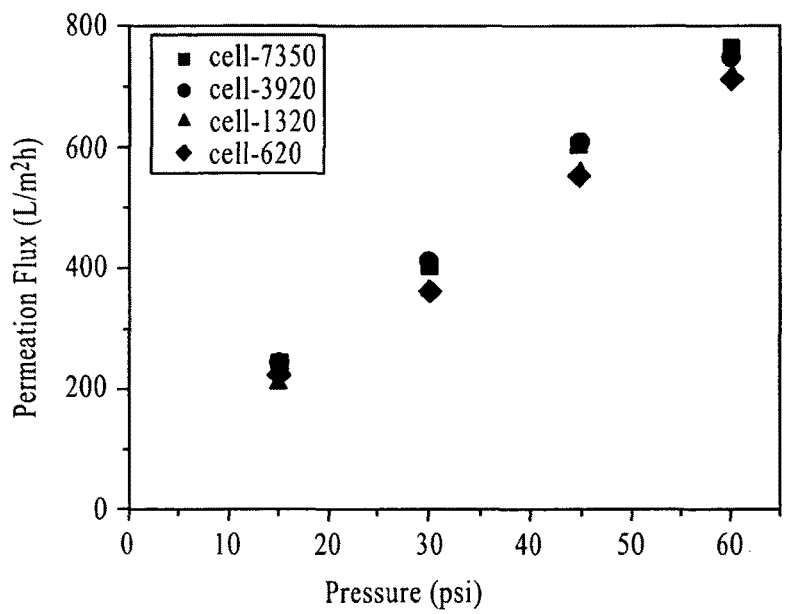
FIG. 1 shows the pure water flux of cellulose/e-spun PAN composite membranes at different pressures.

All documents cited in the present specification are incorporated by reference in their entirety for all purposes.

As used herein, "Fluid" refers to a liquid, gas, or combination thereof.

As used herein, "Nanofiber" refers to a fiber having a diameter in the range of 2 nm to about 2.0 microns.

As used herein, "Nonwoven" means a web or fabric or other medium having a structure of individual fibers that are interlaid, but not in a highly organized manner as in a knitted or woven fabric. Nonwoven webs generally may be prepared by methods that are well known in the art. Examples of such processes include, but are not limited to, and by way of illustration only, melt-blowing, spun-bonding, carding, and air laying.

In one embodiment, the present invention is directed to a membrane that comprises a coating layer containing cellulose or a cellulose derivative disposed on the surface of a porous support layer; where the membrane is prepared by coating a solution comprising cellulose or a cellulose derivative dissolved in an ionic liquid onto a porous support layer (e.g., a water saturated porous support layer), and removing the ionic liquid, thereby forming the coating layer. The membranes of the present invention provide improved flux rates and rejection rates compared to conventionally manufactured membranes, and are particularly suited as membranes for microfiltration, ultrafiltration, reverse osmosis, and forward osmosis.

The thickness and porosity of the coating layer can be controlled at least in part by the cellulose or cellulose derivative concentration of the coating solution. More concentrated cellulose or cellulose derivative solutions tend to provide thicker cellulose (or cellulose derivative) layers after coating, whereas less concentrated solutions tend to provide thinner coating solutions. The concentration of cellulose (or cellulose derivative) contained in the solution can be any concentration suitable for providing the desired cellulose (or cellulose derivative) layer thickness and/or porosity. The maximum concentration of the coating solution can be as high as 25% (w/w) in an ionic liquid, for example by way of heating such as microwave heating. In some embodiments, the concentration of cellulose (or cellulose derivative) is about 0.001%, 0.002%, 0.005%, 0.008%, 0.01%, 0.1%, 0.2%, 0.3%, 0.4%, 0.5%, 0.6%, 0.7%, 0.8%, 0.9%, 1%, 2%, 2.5%, 5%, 10%, 15%, 20% or 25% (w/w), inclusive of all ranges and subranges between these values. In one embodiment, the present invention is directed to a concentration of cellulose (or cellulose derivative) of about 0.1% (w/w).

Relatively concentrated solutions of cellulose (or cellulose derivative) in an ionic liquid can be prepared by heating a mixture of the cellulose (or cellulose derivative) and ionic liquid to a temperature in the range of about 75° C. to about 100° C. Accordingly, in one embodiment, cellulose is dissolved (e.g., at a concentration of about 0.1% (w/w)) by heating in an ionic liquid at about 90° C. Any convenient means of heating may be used, for example heating a mixture of cellulose and an ionic liquid in a heated vessel, or using alternative heating methods such as microwave heating. Accordingly, in one embodiment of the present invention, cellulose or cellulose derivative solutions can be prepared by heating e.g., cellulose in an ionic liquid (e.g., using a microwave heater) to a temperature in the range of about 100° C. to about 150° C.

Any form of cellulose can be used to prepare the membranes of the present invention. For example, the cellulose can be derived from seed hair fibers such as from cotton, from bast fibers, such as from flax, from grass fibers, such as wheat straw, bagasse fiber, kenaf fiber, etc., wood fibers, or regenerated cellulose. In some embodiments of the present invention, the cellulose is, for example, CELLULOSE 620, commercially available from Hubei Chemical Fiber Co. Ltd., China. In other embodiments of the present invention, cellulose is CELLULOSE 1320, 3920, and 7350, commercially available from Buckeye Technologies Inc.; USA. In yet other embodiments of the present invention cellulose is CELLULOSE B-92, B-96, B-HDP, BIOFLOC 92MV, BIOFLOC 96 and BIOFLUFF HDP, manufactured by the Tembec Tartas factory, France.

If the coating comprises a cellulose derivative, the cellulose derivative can include for example cellulose esters such as cellulose acetate, cellulose di-acetate, cellulose triacetate, cellulose phthalates, cellulose succinates, etc., cellulose ethers such as methyl cellulose, ethyl cellulose, hydroxypropylmethylcellulose, etc., mixed ether/esters of cellulose such as methylcellulose acetate, etc.

In one embodiment, the present invention is directed to a cellulose (or cellulose derivative) coating layer having a thickness of about 0.1 to about 1 microns. In other embodiments the cellulose (or cellulose derivative) coating layer thickness ranges from about 0.1 to about 0.9 microns, in some embodiments from about 0.3 to about 0.8 microns, and in some embodiments from about 0.5 to about 0.7 microns. In still other embodiments, the cellulose (or cellulose derivative) coating thickness is about 0.1 microns, about 0.2 microns, about 0.3 microns, about 0.4 microns, about 0.5 microns, about 0.6 microns, about 0.7 microns, about 0.8 microns, about 0.9 microns, and about 1.0 microns. In yet other embodiments, the present invention is directed to a coating layer having a thickness of 0.3 microns (e.g., prepared by coating with a cellulose solution having a concentration of about 0.01% (w/w) to about 1% (w/w)). In still other embodiments, the present invention is directed to a coating layer having a thickness of 0.5 microns (e.g., prepared by coating with a cellulose solution having a concentration of about 1% (w/w) to about 2.5% (w/w)).

Any ionic liquid capable of dissolving a sufficient concentration of cellulose (or cellulose derivative) to provide a cellulose (or cellulose derivative) coating on a porous substrate can be used in preparing the cellulose membranes of the present invention. In one embodiment, the ionic liquid is an N-alkylimidazolonium cation having the general formula 1-$C_nH_{2n+1}$-3-methylimidazolonium $X^-$, wherein n is an integer of from 1-12. $X^-$ can be any suitable anion, for example selected from the group consisting of halogen, perchlorate, pseudohalogen and carboxylates. In some embodiments, the anion for the ionic liquid cation is preferably a halogen ion. The ionic liquid must be hydrophilic. Hydrophilic ionic liquids differ from hydrophobic ionic liquids, which contain one or more fluorine atoms covalently bonded to a carbon atom (e.g., trifluoromethanesulfonate and trifluoroacetate anions).

In particular embodiments, the ionic liquid has an extremely low vapor pressure and typically decomposes prior to boiling. Suitable ionic liquids for use in preparing the membranes of the present invention are liquids at or below a temperature of about 200° C., and in some embodiments are liquids below a temperature of about 150° C. In particular embodiments, the ionic liquid is 1-butyl-3-methylimidazolium chloride (BCl) or 1-ethyl-3-methylimidazolium acetate (EAc), commercially available from Sigma-Aldrich. EAc offers two advantages over other ionic liquids: (a) EAc is non-toxic, and is more suitable for water treatment applications; (b) EAc cellulose solutions have a lower viscosity than solutions of cellulose in other ionic liquids, such as BCl cellulose solutions, which makes it easier to control the coating process, and more readily allows the preparation of cellulose membranes with a thinner top layer.

Other suitable ionic liquids are listed in Table 1.

ionic solvent such as 1-ethyl-3-methylimidazolium acetate) is in the range of about 0.1 Pa·s to about 0.5 Pa·s. In another embodiment, the viscosity of the cellulose (or cellulose derivative) solution (e.g., in an ionic solvent such as 3-methylimidazolium chloride) is in the range of about 0.5 Pa·s to about 0.9 Pa·s. In yet another embodiment, the viscosity of the cellulose (or cellulose derivative) solution varies with the concentration and source of cellulose. For instance, in one embodiment, the viscosity of 0.1% wood pulp in 1-butyl-3-methylimidazolium chloride is about 0.5 Pa·s to about 0.7 Pa·s.

The cellulose (or cellulose derivative) membranes of the present invention can also include flux enhancing, fluid permeable nanochannels incorporated into the cellulose (or cellulose derivative) layer, for example nanochannels formed by a nanofibrous support layer as described below, or alternatively by incorporating nanofillers into the cellulose (or cellulose derivative) layer (e.g., by adding the nanofillers to the cellulose/cellulose derivative solution). The nanofillers can comprise at least one hydrophilic or hydrophobic nanoparticulate filler. Non-limiting examples of suitable hydrophilic nanoparticulate fillers include oxidized carbonaceous nanoparticles, surface grafted carbonaceous nanoparticles, water dispersible nanoclays, and combinations thereof. Carbonaceous nanoparticles can include single-walled carbon nanotubes, multi-walled carbon nanotubes, carbon nanofibers, buckyballs (also known as fullerene $C_{60}$ and/or Buckminster fullerene), graphene sheets, graphite nanoparticles, etc, which are surface grafted or surface oxidized by various known methods, including oxidation by treatment with suit-

TABLE 1

| Ionic liquids | Cation | $R_1$ | $R_2$ | $R_3$ | $R_4$ | A |
|---|---|---|---|---|---|---|
| imidazolium structure | imidazolium | $CH_3$ | $CH_2CH_3$ | H | — | Cl; Br; |
| | | $CH_3$ | $CH_2CH_2CH_3$ | H | — | SCN; |
| | | $CH_3$ | n-$C_4H_9$ | $CH_3$ | — | $N(CN)_2$; |
| | | $CH_3$ | n-$C_4H_9$ | H | — | $C_6H_5COO$; |
| | | $CH_3$ | $CH_2CH=CH_2$ | $CH_3$ | — | $CH_3COO$; |
| | | $CH_3$ | $CH_2CH=CH_2$ | H | — | HCOO |
| | | $CH_2CH_3$ | $CH_2CH=CH_2$ | H | — | |
| | | $CH_3$ | $CH_2CH_2OH$ | H | — | |
| pyridinium structure | pyridinium | n-$C_4H_9$ | — | — | — | Cl |
| ammonium structure | ammonium | $CH_3$ | $CH_2CH_2OH$ | $CH_3$ | $CH_3$ | Cl |
| | | $CH_3$ | n-$C_{14}H_{29}$ | $C_6H_5CH_2$ | $CH_3$ | |

The cellulose (or cellulose derivative) coating thickness and porosity can also be controlled at least in part by varying the viscosity of the cellulose (or cellulose derivative) solution (e.g., by varying the cellulose (or cellulose derivative) concentration, solvent, temperature, cellulose (or cellulose derivative) molecular weight/molecular weight distribution, etc.). In most embodiments, the viscosity of the cellulose (or cellulose derivative) solution in an ionic liquid is in the range of about 0.1 Pa·s to 1 Pa·s. In one embodiment, the viscosity of the cellulose (or cellulose derivative) solution (e.g., in an able oxidizing agents such as ozone, halogenation by treatment with halogens or halogenating agents, hydrogenation, thiolation, esterification, reaction with hydrophilic radicals, reaction with hydrophilic carbenes, nitrenes, etc. In some embodiments, a hydrophilic or water-soluble polymer or oligomer is grafted to the carbonaceous nanoparticles surface. Water dispersible nanoclays include e.g., smectite clays such as montmorillonite and lucentite.

In another embodiment, the nanoparticulate filler can include metal nanoparticles or inorganic nanotubes which may contain metallic components including, but not limited to, gold, cobalt, cadmium, copper, iron, lead, zinc, and palladium, as well as silicate based nanoparticles such as silica, polyhedral oligomeric silsesquioxanes, layered silicates, and derivatives thereof.

In one embodiment, the nanoparticulate filler may be functionalized with at least one hydrophilic functional group including, but not limited to, carboxylic acid groups, carbonyl groups, hydroxy groups, ethylene oxides, alcohols, saccharides and amine groups or supramolecular complexes including DNA molecules, DNA fragments, and protein fragments. Suitable DNA molecules may include those obtained from plants, animals and human, sources being, in some embodiments, from about 1 to about 1000 nucleotides in length, in embodiments from about 10 to about 100 nucleotides in length.

Non-limiting examples of suitable hydrophobic nanoparticulate fillers include carbonaceous nanoparticles, surface functionalized carbonaceous nanoparticles, nano-organoclays, polyhedral oligomeric silsesquioxane cage molecules (e.g., POSS), etc. the hydrophobic carbonaceous nanoparticles can include single-walled carbon nanotubes, multi-walled carbon nanotubes, carbon nanofibers, buckyballs, graphene sheets, graphite nanoparticles, etc. These carbonaceous nanoparticles can be unmodified (if the surface properties are inherently hydrophobic), or further surface-modified to provide hydrophobic properties. For example, the carbonaceous nanoparticles can be reacted with hydrophobic radicals or other reactive species. Nano-organoclays are typically smectite clays (e.g., montmorillonite or lucentite clays modified with hydrophobic amines or quaternary amines (e.g., Nanomer® clays from Nanocor).

In other embodiments, the nanoparticulate filler may be functionalized with at least one hydrophobic functional group including, but not limited to, aliphatic compounds including linear molecules containing hydrocarbons having from about 1 to about 20 carbon atoms, e.g., octadecylamine (ODA)), polypropylene-graft-maleic anhydride oligomers (including one having a $M_n$ of about 3,900 g/mol, a Mw of about 9,100 g/mol, and an acid number of about 47 mg KOH), fluorinated compounds, including 3-(perfluorooctyl)propylamine and the like), and aromatic compounds including aromatic hydrocarbons, e.g. alkylidenediamines such as hexamethylenediamine and the like.

Hydrophobic or hydrophilic nanofiber nanoparticulate fillers, such as modified multiwalled carbon nanotubes, provide additional interconnected (e.g. because the nanofibers are interconnected) molecular channels. These additional interconnected molecular channels increase the permeability of the interfacially polymerized polymer layer. In a particular embodiment, the nanofiber nanoparticulate fillers are hydrophilic.

The nanoparticulate filler may have varying morphologies, from essentially rod-like or cylindrical (e.g., nanofibers), to essentially spherical, (e.g., buckyballs having a soccer ball type configuration combining pentagons and hexagons). Thus, in some embodiments, the diameter of a nanoparticulate filler may be from about 0.3 nm to about 300 nm, in some embodiments from about 0.5 nm to about 50 nm, in other embodiments from about 1 nm to about 30 nm. Where the nanoparticulate filler is rod-like or cylindrical in shape, it may have a length of from about 1 nm to about 500 µm, in some embodiments from about 100 nm to about 50 µm, typically from about 500 nm to about 5 µm. Where the nanoparticulate filler is a carbon nanotube, such as a single-walled carbon nanotube, a multi-walled carbon nanotube, and/or a carbon nanofiber, the diameter of such a nanotube may be from about 1 nm to about 300 nm, in some embodiments about 5 nm to about 200 nm, in other embodiments about 10 nm to about 100 nm.

The nanoparticulate filler may be present in the cellulose (or cellulose derivative) coating layer in an amount of from about 0.1% by weight to about 95% by weight of the coating, in some embodiments from about 0.2% by weight to about 30% by weight of the coating, in other embodiments from about 0.5% by weight to about 20% by weight of the coating. The incorporation of functionalized nanoparticulate filler in the cellulose (or cellulose derivative) layer can improve the mechanical strength of the cellulose (or cellulose derivative) layer, and also increase the fluid permeability of the cellulose (or cellulose derivative) layer (e.g., a hydrophilic nanoparticulate filler can increase the water permeability of the interfacially polymerized polymer layer by providing a hydrophilic channel through the layer. For example, the cellulose (or cellulose derivative) coating layer having modified carbon nanotubes as the functionalized nanoparticulate filler in an amount from about 1% by weight to about 10% by weight can, in certain embodiments, be from about 50% to about 300% stronger in toughness (the toughness was estimated by the area under the stress-strain curve) compared to the cellulose coating layers without the nanoparticulate fillers, and may exhibit an increase in flux rate (with the same rejection rate) that is from about 50% to about 1000% greater than interfacially polymerized polymer layers without the nanoparticulate fillers.

As indicated herein, the cellulose (or cellulose derivative) coating is disposed on a porous support. The porous support can comprise any suitably porous material, for example a woven or nonwoven material, or a porous membrane prepared by phase-inversion methods (for example a polysulfone microfiltration membrane, etc.).

In most embodiments, the porous support comprises nanofibers. In one embodiment, the porous support layer has a thickness of about 50 nm to about 50 µm. In other embodiments, the porous support ranges in thickness from about 50 nm to about 500 nm, in some embodiments about 500 nm to about 5 µm, and in other embodiments about 5 µm to about 50 µm.

The porous support can comprise a symmetric or an asymmetric arrangement of nanofibers. A "symmetric" arrangement of nanofibers means that the average diameter of the nanofibers in any unit volume of the porous support is essentially the same.

An "asymmetric" arrangement of nanofibers means that the average diameter of the nanofibers in some portions of the porous support differs appreciably from the average diameter of the nanofibers in other portions of the fibrous support. For example, the porous support can be in the form of a sheet having at least two layers such that one layer (i.e. the "top layer") is disposed on the top face of the sheet, another layer (i.e., the "bottom layer") is disposed on the bottom face of the sheet, and optionally one or more additional layers (i.e., "middle layers") are disposed between the top and bottom layers of the porous support, wherein the nanofibers comprising at least one of the layers has an average fiber diameter which is different from the average fiber diameter of the nanofibers of another layer.

"Asymmetric" porous supports also include structures in which the average diameter of the nanofibers increase more or less continuously from one surface of the porous support to the opposing surface. For example, porous supports of the present invention can be formed by simultaneously forming nanofibers of two or more different average fiber diameters into a non-woven structure. By varying the relative rates at which the different nanofibers are formed, an asymmetric structure can be prepared in which the fiber diameter changes continuously from one surface to the opposing surface. The rate of change of the average fiber diameter through the thickness of the porous support can be "slow" or relatively abrupt. It will be recognized that the term "layer" refers to a region of the support in which the average fiber diameter is relatively constant, but need not be sharply defined.

In another embodiment, the average diameter of the nanofibers in the layer contacting the coating layer ranges from about 2 nm to about 100 nm, and the average diameter of the nanofibers disposed below the layer contacting the coating layer ranges from about 100 nm to about 2000 nm.

The nanofibers themselves can be solid, hollow, or have a core-shell structure such that the composition of the outer surface of the nanofiber is different from the composition of the inner portion of the nanofiber.

For example, in one embodiment, one or more of the nanofibers of the porous support can be hollow such that the central void in the hollow format occupies about 1% to about 90% of the total effective volume of the surface-modified nanofiber.

In an alternative embodiment, one or more of the nanofibers can have a core-shell structure, wherein the volume of the core of the core-shell structure occupies from about 1% to about 90% of the total effective volume of the surface-modified nanofiber. Alternatively the core can comprise a polymer which is different from the polymer comprising the shell of the nanofiber. Core-shell nanofibers comprised of two or more different polymers can be prepared from two different polymer solutions as described herein.

In another alternative embodiment, the same polymer can be used in the core and the shell of a core-shell nanofiber, except that the core or shell layers further comprise additional ingredients. For example, such core-shell nanofibers can be prepared from polymers such as PVP, where the shell layer further comprises amorphorous $TiO_2$. In yet another embodiment, a core-shell nanofiber can have a polymeric shell containing an additive, and an extractable core, which can be extracted to provide a hollow nanofiber with an additive-containing shell layer. For example, such nanofibers can be prepared with a PVP shell further comprising amorphous $TiO_2$ and an oil core. After extraction of the oil core, the resulting hollow nanofibers may be useful for a wide range of applications including but not limited to membrane separation processes, nanofluidics and hydrogen storage. The skilled artisan will appreciate that polymers other than PVP and additives other than amorphous $TiO_2$ could be used depending upon the desired application. Non-limiting examples of such polymers and additives include those disclosed herein. As described herein, the chemical properties of the nanofibers can be modified by appropriate selection of the polymers and additives used, in order to provide the desired separation properties for membranes prepared from such porous supports.

The voids in the porous support can be of various sizes depending on the number and diameter of the nanofibers producing the void. As the diameter of the nanofibers making up a particular void increases, the size of the void decreases. However, the voids produced by either the symmetric or asymmetric arrangement of nanofibers of the present invention are interconnected. The size of the interconnected pores can be varied according to provide suitable flux, separation properties, and mechanical properties for membranes prepared from the fibrous support.

The nanofibers of the porous support of the present invention can be prepared from suitable polymers, including but not limited to polyolefins including polyethylene and polypropylene, as well as copolymers thereof; polysulfones such as aromatic polysulfones, polyethersulfones, etc.; halopolymers such as polyvinyl chloride, polyvinylidene chloride, polyvinylidene fluoride, etc.; polyesters such as polyethyleneterephthalate (PET), polytrimethylene terephthalate, polybutylene terephthalate, etc.; polyamides such as nylon 6, nylon 66, nylon 612, nylon 12, etc., aromatic polyamides; polycarbonates; polystyrenes; polyacrylonitriles; polyacrylates such as polymethylmethacrylate, copolymers of acrylic acid, methacrylic acid, hydroxyethylmethacrylate, etc.; polyacetates such as polyvinyl acetate and partially hydrolyzed polyvinyl acetates; polyalcohols such as polyvinyl alcohol, cationically modified polyvinylalcohol, anionically modified polyvinylalcohol; polysaccharides such as chitosan, hyaluronan, cellulose, regenerated cellulose, cellulose ethers such as methylcellulose, ethylcellulose, hydroxyethyl cellulose, cellulose esters such as cellulose acetates (including mono-, di-, and tri-acetates); proteins such as collagen, gelatin, etc.; ionomers; polyalkylene oxides such as polyethylene oxide, polypropylene oxide, polyethylene glycols, crosslinkable polyethylene glycol, etc.; polyurethanes; polyureas; poly(urethane-urea); polyimines such as polyethylene imine; polyvinylpyrrolidone; polyacrylic acids; polymethacrylic acids; polysiloxanes such as polydimethylsiloxane; poly(ester-co-glycol) copolymers; poly(ether-co-amide) copolymers; and mixtures, derivatives, copolymers and crosslinked forms of any of the above. Derivatives include ethers, esters, amides, etc. formed by alkylation, acylation etc. of functional groups (e.g., hydroxyl or amine groups), or by hydrolysis of hydrolyzable functional groups (e.g., esters, amides, anhydrides, etc.) present in the polymer of which the nanofiber is comprised. In particular embodiments, the nanofibers of the porous supports comprise polyacrylonitrile (PAN), polyethersulfone (PES), polyvinylidenefluoride (PVDF), crosslinked water-soluble polymers such as polyvinyl alcohol, polyvinylpyrrolidone, modified cellulose, modified chitosan, etc.

In some embodiments nanofibers of the porous support are prepared from polyacrylonitrile (PAN) (e.g., commercially available from Aldrich) or from polyvinylalcohol (PVA) (e.g., commercially available from Polysciences, Inc.). In other embodiments, nanofibers contained in the porous support are prepared from polyethersulfone (PES) and polysulfone (PSF) (e.g., commercially available from Solvay). In yet other embodiments, nanofibers of the porous support are prepared from polyamide (PA) or nylon-6 (N-6).

In some embodiments, the nanofibers of the porous support of the present invention comprise an uncrosslinked polymer, for example when the polymer is insoluble in any of the solvents which may be present in fluid medium contacting the porous support. However, in other applications, it may be desirable to prepare a porous support from polymers which are partially or completely soluble in solvents which may contact the fibrous support in use. In one embodiment, nanofibers comprising water soluble polymers such as polyvinyl alcohol, polysaccharides (e.g., chitosan and hyaluronan), polyalkylene oxides (e.g., polyethylene oxide), gelatin and derivatives can be cross-linked using methods known in the art. For example, polymers containing hydroxyl or amine groups (e.g., polyvinyl alcohols, polysaccharides, proteins, etc.) can be cross-linked using aldehydes (e.g., formaldehyde), dialdehydes (e.g., $C_2$-$C_8$ dialdehydes such as glutaraldehyde, glyoxal), mono-aldehydes having acid functionality (e.g., glyoxylic acid), polycarboxylic acids (e.g., oxydisuccinic acid, citric acid), etc. These compounds are capable of reacting with at least two hydroxyl (or amine) groups of a water-soluble polymer. Other crosslinking methods include thermal and radiation crosslinking methods (photo crosslinking, electron beam crosslinking, gamma crosslinking, etc.) of polymers optionally modified with, or mixed with, suitable cross-linking and radiation sensitizing agents/catalysts. Two important criteria for selection of cross-linking agent or method are that (1) the cross-linking agent or method should not dissolve the nanofibers, or (2) introduce large dimensional changes in the fibrous support (e.g., hydrophilic electro-spun nanofiber supports may display very large shrinking and hydrophobic solvents such as hydrocarbons because of their hydrophilic nature). In one embodiment, the nanofibers comprise polyvinyl alcohol crosslinked with glutaraldehyde. In other embodiments, the nanofibers comprise polyacrylonitrile, polysulfone, polyethersulfone, polyvinylidene fluoride, cellulose acetate, or polyvinyl alcohol.

In another embodiment, the present invention is directed to a porous support layer which further comprises a plurality of layers each comprising nanofibers, and wherein the average diameter of the nanofibers in the layer contacting the coating layer is less than the average diameter of the nanofibers disposed below the layer contacting the coating layer.

In other embodiments, the porous support can comprise three or more layers: a top layer, one or more middle layers, and a bottom layer, wherein the middle layers are disposed between the top and bottom layers. The top layer as used herein, is the layer of porous support that contacts the coating layer. The bottom layer as used herein is the layer of porous support disposed below the layer contacting the coating layer. The top and bottom layers are continuously connected by the one or more middle layers (when present—otherwise the top and bottom layers are connected to each other), and all of the layers operate as a single unit.

In other embodiments, the top layer of the porous support has an average thickness from about 40 nm to about 500 nm and the nanofibers have an average diameter of about 75 nm to about 500 nm, the bottom layer has an average thickness of about 5 µm to about 50 µm and the nanofibers of the bottom layer have an average diameter greater than about 5 µm. When present, the middle layer has a thickness ranging from about 500 nm to an average thickness of less than about 5 µm. The nanofibers of the middle portion have an average diameter of about 100 nm, in some embodiments about 100 nm to about 5 µm.

The diameter of the nanofibers in the top, middle (when present) and bottom layers of the fibrous support can vary discontinuously or continuously. For example, in a discontinuous arrangement the nanofibers of each layer can have the same average diameter, but the average diameter of the fibers in each layer is different. As a result, the average fiber diameter changes relatively abruptly from one layer to the next. In a continuous arrangement, the average fiber diameter of the various layers changes more or less continuously, such that the average fiber diameter increases smoothly through the thickness of the fibrous support. Typically, the nanofibers of the top layer of the porous support, which contact the cellulose coating layer, have a smaller average fiber diameter compared to the fibers of the middle and bottom layers.

According to the present invention, in one embodiment the porous support further comprises a substrate layer disposed on the opposing surface of the porous support, such that the porous support is disposed between the coating layer comprising cellulose and the substrate layer. The substrate layer is typically a porous layer, for example a woven or non-woven fabric. In one embodiment, the substrate layer is a non-woven fabric comprising inorganic or organic polymeric fibers, for example polyester fibers, e.g. comprising poly(ethylene terephthalate); polyolefin fibers, e.g. comprising polypropylene; cellulosic fibers, e.g. comprising cellulose or cellulose acetate; polyamide fibers; poly(urethane) fibers; glass or mineral fibers; inorganic fibers (e.g., ceramic fibers, metallic fibers, and mixtures thereof. The non-woven substrate layer can have an average thickness from about 20 µm to 20 mm. One function of the non-woven matrix is to provide additional support to the symmetric or asymmetric arrangement of the fibrous supports disclosed herein.

As discussed herein, in some embodiments the membranes of the present invention comprise a porous support comprising nanofibers, a coating comprising cellulose (or a cellulose derivative) (prepared by coating the porous support with a solution of cellulose (or a cellulose derivative) dissolved in an ionic liquid) disposed on the surface of the porous support, and a substrate layer disposed on the opposing surface of the porous support, such that the porous support is disposed between the cellulose (or a cellulose derivative) coating and the substrate layer. In one embodiment, the membranes of the present invention are useful as ultrafiltration membranes, nanofiltration membranes, reverse osmosis membranes, or forward osmosis membranes. In another embodiment of the invention the ultrafiltration membrane, nanofiltration membrane, reverse osmosis membrane, or forward osmosis membrane exhibit high permeation flux, high rejection rate, and reduces the degree of fouling with excellent chemical resistance.

In one embodiment, the membranes of the present invention have a permeation flux for water filtration of about 100 $L/m^2$ h to about 700 $L/m^2h$ at a pressure of about 15 psi. In another embodiment, the membranes of the present invention have a permeation flux for water filtration of about 200 $L/m^2$ h to about 300 $L/m^2h$ at a pressure of about 15 psi. In another embodiment, the membranes of the present invention have a permeation flux for water filtration of about 100 $L/m^2$ h to about 200 $L/m^2h$ at a pressure of about 15 psi. In another embodiment, the membranes of the present invention have a permeation flux for water filtration of about 400 $L/m^2$ h to about 200 $L/m^2h$ at a pressure of about 15 psi. In another embodiment, the membranes of the present invention have a permeation flux for oil/water separation of about 40 $L/m^2h$ to about 160 $L/m^2h$ at a pressure of about 15 psi. In another embodiment, the membranes of the present invention have a permeation flux for oil/water separation of about 120 $L/m^2h$ to about 160 $L/m^2h$ at a pressure of about 15 psi. In another embodiment, the membranes of the present invention have a permeation flux for oil/water separation of about 80 $L/m^2h$ to about 120 $L/m^2h$ at a pressure of about 15 psi. In another embodiment, the membranes of the present invention have a permeation flux for oil/water separation of about 40 $L/m^2$ h to about 80 $L/m^2h$ at a pressure of about 15 psi. Cellulose coating thickness for membranes having the above permeation flux values ranges from about 0.3 microns to about 0.5 microns.

In another embodiment, the membranes of the present invention have a rejection rate for oil/water separation of at least about 99.0% at a pressure of about 15 psi. In yet another embodiment, the membranes of the present invention have a rejection rate for oil/water separation of at least about 99.2% at a pressure of about 15 psi. In still another embodiment, the membranes of the present invention have a rejection rate for oil/water separation of at least about 99.5% at a pressure of about 15 psi. In still another embodiment, the membranes of the present invention have a rejection rate for oil/water separation of at least about 99.7% at a pressure of about 15 psi. In yet another embodiment, the membranes of the present invention have a rejection rate for oil/water separation of at least about 99.7% at a pressure of about 60 psi. In still another embodiment, the membranes of the present invention have a rejection rate for oil/water separation of at least about 99.5% at a pressure of about 60 psi. In still another embodiment, the membranes of the present invention have a rejection rate for oil/water separation of at least about 99.2% at a pressure of about 15 psi. Cellulose coating thicknesses for membranes having the above rejection rate values ranges from about 0.3 microns to about 0.5 microns.

One or more membranes of the present invention can be incorporated into a membrane module equipped with means for contacting a fluid mixture with the surface of the cellulose coating of the at least one membrane, means for removing retentate, and means for removing permeate. The fluid separation membranes of the present invention can be used in any suitable configuration, for example as tubular, hollow fiber or flat sheet membranes, incorporated into conventional membrane module configurations known in the field of membrane separations. For example, in one embodiment, the membranes of the present invention can be flat sheet liquid separation membranes configured in a spiral wound membrane module or a flat sheet membrane module. In such configurations, the membranes can, as needed, be sandwiched between the appropriate spacers inside of a pressure housing. One or more membranes may be incorporated into each membrane module, and one or more modules can be interconnected with the appropriate piping, pumps, etc. known in the art to provide a fluid separation system capable of carrying out separations in fluid mixtures.

In another embodiment, the present invention is directed to a method of making a membrane comprising the steps of (a) preparing a porous support (e.g., comprising nanofibers); (b) preparing a solution of cellulose (or a cellulose derivative) in an ionic liquid; (c) coating the cellulose (or a cellulose derivative) solution of step (b) onto one side of the porous support; and (d) removing the excess solution of cellulose (or a cellulose derivative) from the porous support. The coating solution can comprise any form of cellulose (or a cellulose derivative) described herein, dissolved in any of the ionic solvents described herein.

In specific embodiments, the solution of cellulose (or a cellulose derivative, such as cellulose mono-, di-, or triacetate) dissolved in an ionic liquid is spread (for example using a doctor blade, spraying, dip coating, etc.) onto one surface of a porous support, for example a nonwoven nanofiber support. The porous support can be optionally saturated with water to control the penetration of the cellulose coating solution into the porous support. After coating the cellulose (or a cellulose derivative) solution onto the porous support, the coated support can be immersed into an ethanol bath to remove excess cellulose (or a cellulose derivative) solution from the surface of the membrane by washing with an appropriate solvent, such as ethanol. The resulting membrane can then be dried, for example in an oven at low pressure. The thickness of the coating layer as well as the morphology of the surface of the membrane can be measured using conventional techniques such as SEM.

In yet another embodiment, the porous support comprising nanofibers may be prepared by any suitable method of manufacturing nanofibers. The porous support can be prepared using electro-spinning, electro-blowing, blowing-assisted electro-spinning, and/or solution blowing or casting technologies. Blowing-assisted electro-spinning and electro-blowing both use electric force and gas-blowing shear forces. In blowing-assisted electro-spinning processes, the electric force is the dominating factor, while the gas-blowing feature can assist in shearing the fluid jet stream and in controlled evaporation of the solvent (lower throughput, smaller diameter). In contrast, in electro-blowing processes the gas-blowing force is the dominating factor to achieve the desired spin-draw ratio, while the electric force may enable further elongation of fiber (higher throughput, larger diameter). Electro-spinning processes use only electric force, but without the assistance of gas flow, while solution blowing processes use only gas flow, without the use of electric force. In one particularly useful embodiment, the middle layer, such as PAN or PVA, may be electrospun on a substrate, such as a non-woven PET micro-filter (FO2413 from Freudenburg Nonwovens) utilizing methods known to those skilled in the art.

The applied electric field potentials utilized in electro-spinning can vary from about 10 to about 40 kV, typically from about 15 to about 30 kV, with a distance between the spinneret and the collector of from about 5 to about 20 cm, typically from about 8 to about 12 cm, and a solution flow rate of from about 10 to about 40 µL/min, typically from about 20 to about 30 µL/min. In one embodiment the electro-spinning process can use an applied electric field strength of about 2 kV/cm and a solution flow rate of about 25 µL/min.

Methods for forming fibers by electro-blowing are within the purview of those skilled in the art and include, for example, the methods disclosed in (e.g., the method described in U.S. Published Patent Application No. 2005/0073075, herein incorporated by reference in its entirety for all purposes). Briefly, in an electro-blowing process, an electrostatic field is combined with a gaseous flow field. Like melt blowing (no charge required), where the liquid droplet is pulled out by the gaseous flow, with electro-blowing the combined forces are strong enough to overcome the surface tension of the charged liquid droplet. This permits the use of electrostatic fields and gas flow rates that are significantly reduced compared to either method alone. Both the gaseous flow stream and the electrostatic field are designed to draw the fluid jet stream very fast to the ground. The spin-draw ratio depends on many variables, such as the charge density of the fluid, the fluid viscosity, the gaseous flow rate and the electrostatic potential. In some embodiments, these variables can be altered in mid-stream during processing. For example, injection of electrostatic charges can be used to increase the charge density of the fluid or even convert a neutral fluid to a charged fluid. The temperature of the gaseous flow can also change the viscosity of the fluid. The draw forces increase with increasing gaseous flow rate and applied electrostatic potential. The intimate contact between the gas and the charged fluid jet stream provides more effective heat transfer than that of an electro-spinning process where the jet stream merely passes through the air surrounding the jet stream. Thus, the gas temperature, the gas flow rate, and the gaseous streaming profile can affect and control the evaporation rate of the solvent if the fluid is a solution. The gas temperature can vary from liquid nitrogen temperature to superheated gas at many hundreds of degrees; the preferred range depends on the desired evaporation rate for the solvent and consequently on the solvent boiling temperature. The streaming profiles are aimed at stabilizing the jet streams and should be similar to those used in melt blowing.

In electro-blowing embodiments, the feeding rate of the polymer solution per spinneret for forming the fibrous support may be from about 5 to about 2500 µL/min, typically from about 20 to about 300 µL/min, in embodiments from about 35 to about 150 µL/min. The air blow temperature may be from about 0° C. to about 200° C., typically from about 20° C. to about 120° C., in embodiments from about 25° C. to about 90° C. The air blow rate per spinneret may vary from about 0 standard cubic feet per hour (SCFH) to about 300

SCFH, typically from about 5 SCFH to about 250 SCFH, in embodiments from about 20 SCFH to about 150 SCFH. The electric potential can be from about 1 kV to about 55 kV, typically from about 15 kV to about 50 kV, in embodiments from about 30 kV to about 40 kV, with a typical spinneret to collector distance of about 10 cm.

Where the nanofibrous support is formed by blow-assisted electro-spinning, the feeding rate of the polymer solution per spinneret for forming the nanofibrous scaffold may be from about 5 to about 150 µL/min, typically from about 10 to about 80 µL/min, in embodiments from about 20 to about 50 µL/min. The air blow temperature may be from about 0° C. to about 200° C., typically from about 20° C. to about 120° C., in embodiments from about 25° C. to about 90° C. The air blow rate per spinneret may vary from about 0 standard cubic feet per hour (SCFH) to about 300 SCFH, typically from about 5 SCFH to about 250 SCFH, in embodiments from about 20 SCFH to about 150 SCFH. The electric potential can be from about 1 kV to about 55 kV, typically from about 15 kV to about 50 kV, over a typical in embodiments from about 20 kV to about 40 kV, with a typical spinneret to collector distance of about 10 cm.

In other embodiments, porous supports may be formed by solution blowing, which is similar to melt blowing except a polymer solution instead of a polymer melt is used to fabricate the scaffolds. Such techniques are within the purview of those skilled in the art and include the formation of a polymeric material and blowing agent in a single phase, typically a liquid, which is then sprayed utilizing conventional equipment similar to that utilized in electro-blowing, except that an electrical field is not utilized in spraying the liquid. Parameters useful for solution blowing include, for example, the use of very high shear forces obtained by using gas flow at speeds from about one hundredth of the speed of sound to near the speed of sound in air, i.e., about 600 miles per hour.

In one embodiment of the present invention, a solution of cellulose (or a cellulose derivative) dissolved in an ionic liquid is coated onto one side of the porous support (e.g., a nanofibrous porous support as described herein). The thickness of the cellulose (or a cellulose derivative) layer can be controlled by appropriate selection of the cellulose (or a cellulose derivative) solution properties, such as cellulose (or a cellulose derivative) concentration, solution viscosity, etc., or by controlling the amount of cellulose (or a cellulose derivative) solution deposited onto the surface of the porous support.

In addition, the porous support can be saturated with a liquid in which the cellulose (or a cellulose derivative) solution is insoluble to control penetration of the cellulose (or a cellulose derivative) solution into the porous support. In a particular embodiment, the porous support is saturated with water. The water prevents excessive saturation of the porous support with the cellulose (or a cellulose derivative) solution, thereby providing a relatively thin cellulose (or a cellulose derivative) layer. The amount of water in the porous support can be varied to provide the desired degree of "penetration" of the porous support by the cellulose (or a cellulose derivative) layer. Some degree of interpenetration of the porous support by the cellulose (or a cellulose derivative) layer is desirable in order to promote sufficient adhesion between the cellulose (or a cellulose derivative) layer and the porous support. The cellulose (or a cellulose derivative) layer can penetrate the porous support only slightly (e.g., the porous support penetrates the cellulose (or a cellulose derivative) layer about 1% of the average thickness of the cellulose (or a cellulose derivative) layer). Alternatively, the cellulose (or a cellulose derivative) layer can completely penetrate the entire thickness of the cellulose (or a cellulose derivative) layer. For example, if the support layer comprises nanofibers, at least some of the nanofibers of the support layer can penetrate through the entire thickness of the cellulose (or a cellulose derivative) layer. The nanofibers comprise a highly porous inter-connected structure which can provide significantly lower resistance to permeate flow and thus a higher flux rate compared to conventional microporous support-based membranes, for example thin film composite membranes. In addition, the nanofibers penetrating the cellulose (or a cellulose derivative) layer can function as "conduits" which increase the permeate flux of membranes of the present invention.

The present invention is described in greater detail in the sections below.

EXAMPLES

The following examples with reference to FIGS. 1-21 are used to illustrate the present invention.

Materials and Preparation

Cellulose.

Cellulose 620 (cotton linter pulp, degree of polymerization=620) was supplied by Hubei Chemical Fiber Co. Ltd. in China. Cellulose 1320, 3920, and 7350 (cotton linter pulp) were supplied by Buckeye Technologies Inc. from USA. Cellulose B-92, B-96, and B-HDP (wood bleached pulp: Biofloc 92 MV, Biofloc 96, and Biofluff HDP) were supplied by the Tembec Tartas factory in France.

Ionic Solvents:

1-Butyl-3-methylimidazolium chloride (BASF quality, >95%) and 1-ethyl-3-methylimidazolium acetate (BASF quality, >90%) was purchased from Sigma-Aldrich and used without further treatment. 1-Butyl-3-methylimidazolium chloride was also synthesized as described below.

Polymers (for Nanofiber Fabrication):

Polyacrylonitrile (PAN, with weight-averaged molecular weight of $1.5 \times 10^5$ g/mol) was purchased from Aldrich, and polyvinyl alcohol (PVA, with weight-averaged molecular weight of $8.5 \times 10^4 \sim 1.24 \times 10^5$ g/mole, 96% hydrolyzed) was purchased from Polysciences Inc. Polyethersulfone (PES, Radel-A100) and polysulfone (PSF, Ude13500) were supplied by Solvay. Polyamide (PA) and nylon-6 (N-6) are commercially available.

Membrane Support:

Poly(ethylene terephthalate) non-woven substrate (PET microfilter F02413 with an average fiber diameter of about 10 µm) was provided by Freudenberg Nonwovens (Hopkinsville, Ky.).

Seed Solutions:

An emulsified oil/water mixture (1350 ppm soybean oil/150 ppm DC 193 (emulsifier) in DI water, prepared by stirring at stirring at 12,000 rpm for 10 minutes) was used to test the filtration performance of cellulose membranes. A series of dextrans (from Aldrich) with different molecular weights: 4 k-6 k, 9 k-11 k, 15 k-17 k, 35 k-45 k, 64 k-76 k, 100 k-200 k, 200 k-300 k was dissolved in Milli-Q water to prepare 5,000 ppm of seed solution containing sodium azide (500 ppm), and used to test the molecular weight cut-off (MWCO) of the cellulose membrane. 500 ppm of sodium alginate (80-120 kDa) in DI water was employed to test the fouling of the cellulose membrane.

Testing Instruments:

A Millipore stirred ultra-filtration cell (model 8050) with an effective filtration area of 0.00134 $m^2$ as well as a custom-built cross-flow filtration devise with an active filtration area of 0.00652 $m^2$ were used to perform dead-end filtration. A total organic carbon analyzer (TOC-5000, Shimadzu Corp.) was employed to determine the results of MWCO measurements. The TGA scans of the samples were collected at 10° C./min from 60° C. to 800° C. under an air flow by using TGA 7 from Perkin-Elmer Inc. The $^1$H NMR spectra were obtained at 25° C. on a Varian GEMINI 2300 NMR spectrometer with $CDCl_3$ as the solvent. Wide angle X-ray diffraction (WAXD) and small angle X-ray scattering (SAXS) experiments were carried out at beamline X27C in the National Synchrotron Light Source (NSLS), Brookhaven National Laboratory (BNL). The wavelength used was 0.1371 nm. The sample-to-detector distance for WAXD was 118.5 mm, and that for SAXS was 1813.5 mm. A Fuji image reader was used for the data collection.

Example 1

Preparation of the 1-Butyl-3-Methylimidazolium Chloride (BCl)

Preparation of 1-butyl-3-methylimidazolium chloride (BCl): 1-Butyl-3-methylimidazolium chloride was prepared by heating a mixture of 1-methylimidazole and 1-chlorobutane (molar ratio of 1:1) at 90° C. for 24 h followed by washing with ether for three times. The chemical structure of the ionic liquid was confirmed by $^1$H NMR and is shown in Scheme 1 (I). The structure of another ionic liquid, 1-ethyl-3-methylimidazolium acetate purchased from Aldrich is shown in Scheme 1 (11).

Scheme 1. Chemical structures of 1-butyl-3-methylimidazolium chloride and 1-ethyl-3-methylimidazolium acetate

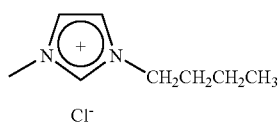

(I)

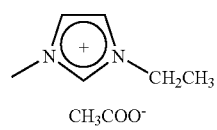

(II)

The $^1$H NMR ($D_2O$ as the solvent, d, ppm) spectrum consists of the following peaks: 8.606 (N—CH—N, s, 1H), 7.374 (N—CH—CH, s, 1H), 7.327 (N—CH—CH, s, 1H), 4.095 (N—$CH_2$, t, 2H), 3.789 (N—$CH_3$, t, 2H), 1.747 (N—$CH_2$—$CH_2$, m, 2H), 1.229 (N—$CH_2$—$CH_2$—$(CH_2)_2$, m, 2H), 0.819 ($CH_3$, t, 3H), which confirms the structure of the ionic liquid (1-butyl-3-methylimidazolium chloride).

Example 2

Preparation of Cellulose Solution

Cellulose solutions were prepared by adding 0.02 g of various grades of cellulose to 19.98 g of the respective ionic liquid, and then heating the mixture at 90° C. for 1 hour with an oil bath, while stirring for 1 hour. After cooling to room temperature, a clear solution having a concentration of 0.1% was ready for use.

Example 3

Preparation of Electro-Spun Supports

All electro-spun supports, including PAN, cross-linked PVA, PA, nylon-6, PES, and PSF were produced in the laboratory (except for PA and nylon-6 supports, which were obtained from Donaldson and Du Pont, respectively) using conditions similar to those described in U.S. application Ser. Nos. 11/664,650 and 11/951,248, herein incorporated by reference in their entirety for all purposes.

PAN e-spun support: fiber diameter is about 500 nm, and support thickness is 40~50 µm;

PVA e-spun support: fiber diameter is about 230 nm, and support thickness is 40~50 µm;

PA e-spun support: fiber diameter is about 200 nm, and support thickness is 5~20 µm;

Nylon-6 e-spun support: fiber diameter is 500~1000 nm, and support thickness is about 20 µm;

PES e-spun support: fiber diameter is about 500 nm, and support thickness is 40~50 µm;

PSF e-spun support: fiber diameter is about 700 nm, and support thickness is 40~50 µm.

Example 4

Preparation of Cellulose Membranes

The PAN e-spun supports were sealed along the edges by tape (typically, 0.5 mm height of tape, 3×4 inches). The taped support was soaked in water (room temperature, 2 min, DI water); and the soaked support was then drained of excess water (with a rubber rod). The cellulose solution dissolved in an ionic liquid (either BCl or EAc) was then deposited onto one side of the membrane (4.0 g of 0.1 wt % solution). After spreading the cellulose solution with a coating machine (Automatic Drawdown Machine, Model DP-8301, Paul N, Gardner Company, Inc.; speed: 2 inches/min, room temperature) the membrane was slowly dunked into an ethanol bath (30 min, room temperature, moving speed: 0.5 inch/min) and subsequently, the membrane was dried in an oven at low pressure (room temperature, 5 min, humidity: 60%). The membrane was then washed in distilled water (room temperature, 1 min) and dried prior to use (room temperature, humidity: 60%, 60 min). The flow chart below shows the coating of a cellulose layer on a PAN e-spun support.

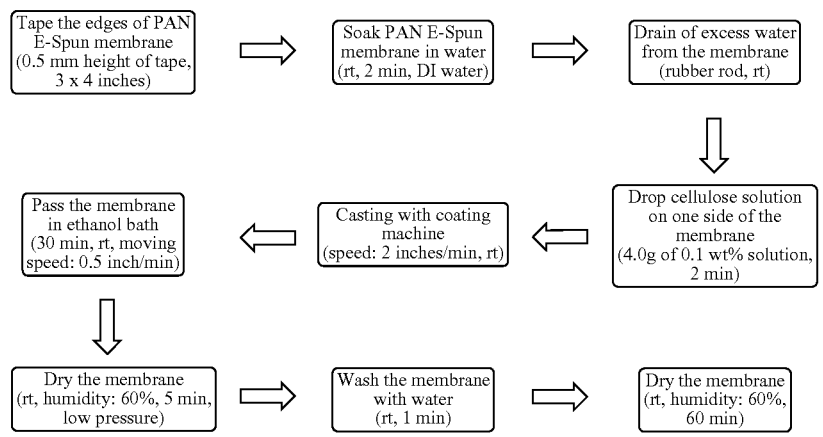

The thickness of the cellulose coating, and the surface morphology was evaluated by SEM. The thickness of the cellulose coating layer was about 0.3-1.0 μm, and the surface morphology was smooth and flat.

Example 5

Cellulose Membranes Prepared from Solutions of Cotton Linter Pulps with Different Degree of Polymerization The effect of different degrees of polymerization of the cellulose on membrane properties such as permeation flux and rejection were studied using four cellulose membranes that were coated with solutions of different cotton linter pulps in 1-butyl-3-methylimidazolium chloride (BCl). The concentration of the cellulose solutions were 0.1%. The thicknesses of the top layers of these membranes were about the same (0.5 μm) as confirmed by SEM images.

Figure 2:
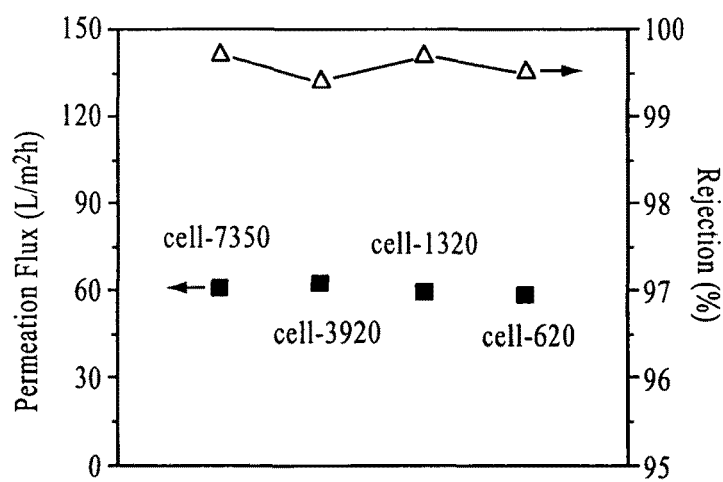
FIG. 2 shows the permeation flux and % rejection for cellulose/e-spun PAN composite membranes evaluated with an oil/water emulsion at 15 psi.

A dead-end nano-filtration cell was used to evaluate the pure water flux (FIG. 1). The fluxes of all membranes were found to be very similar. Further testing of the permeation flux and rejection of these membranes was performed with oil/water seed solutions at 15 psi without stirring (FIG. 2). Similar permeation flux and percent rejection values were observed, leading to the conclusion that the flux and rejection was not significantly affected by the differing degree of polymerization in cotton linter pulps.

Example 6

Cellulose Membranes Prepared by Using Different Wood Bleached Pulps

To further determine the effect of the cellulose source on permeation flux and rejection, a series of wood bleached pulps were dissolved and coated under the same conditions (0.1% wood pulps in BCl, 0.5 μm thick cellulose layer). The MWCO (molecular weight cut-off) was evaluated as follows: The membrane was placed in a dead-end cell and pressurized to 10 psi. Then, 50 ml of pure water permeate was collected to verify equilibration of the membrane. After equilibration, 50 mL of 5,000 ppm dextran was added to the cell to perform the test as follows: The first 5 mL of the permeate was discarded, and the next 5 mL of permeate was collected for analysis. This procedure was repeated for each dextran sample. A TOC analyzer was used to evaluate each sample.

Figure 3:
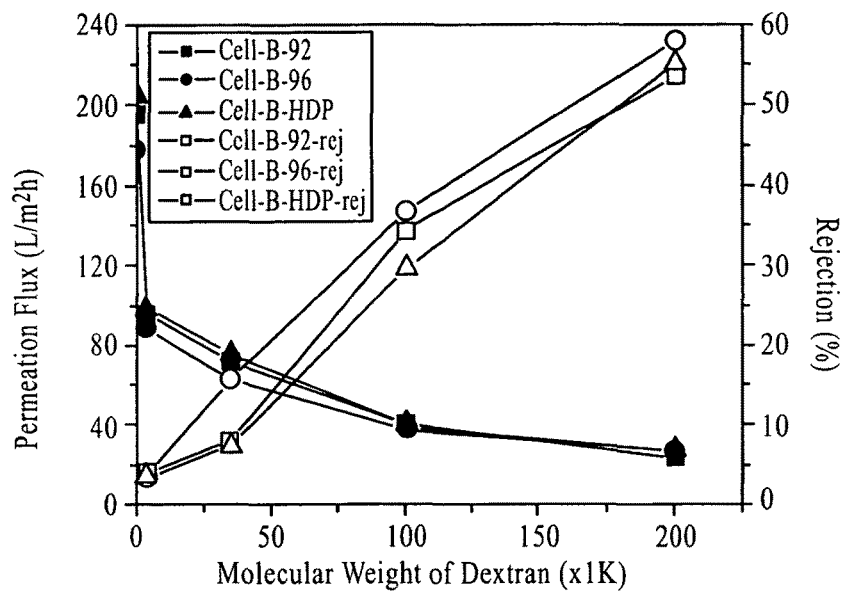
FIG. 3 shows the permeation flux and % rejection for cellulose/e-spun PAN composite membranes, prepared from different cellulose sources, as a function of MWCO.

FIG. 3 shows that the permeation flux of all these membranes were similar to each other, and also similar to the results of membranes prepared from cotton linter pulp coating solutions. This similarity in the membrane properties may be due to the complete dissolution of the cellulose in the ionic liquid at a molecular level, so that the various coating solutions of different molecular weight cellulose from different sources had similar solution properties, and provided cellulose coatings with similar filtration characteristics.

Example 7

Cellulose Membranes with Different Thickness of the Top Layer

Figure 4:
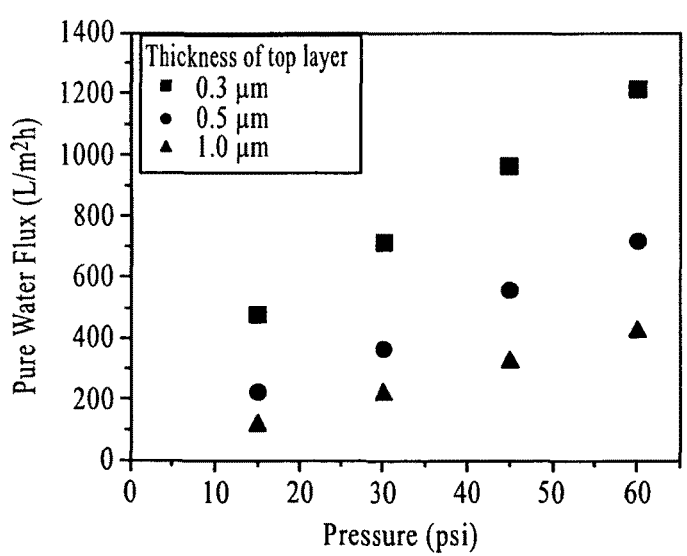
FIG. 4 shows the pure water flux for cellulose/e-spun PAN composite membranes at different pressures.
Figure 5:
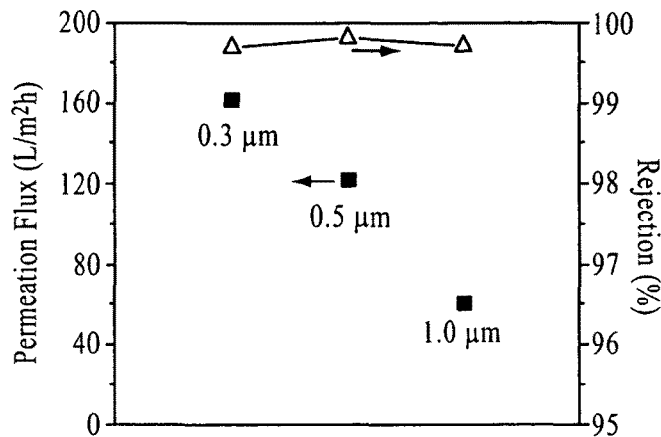
FIG. 5 shows the permeation flux and % rejection for cellulose/e-spun PAN composite membranes evaluated with an oil/water emulsion at 15 psi; three different cellulose layer thicknesses.

By controlling the amount of cellulose solution used in the coating process, a series of cellulose membranes with different thicknesses of the top layer were prepared and evaluated for their behavior under conditions of increasing pressure. The pure water flux, permeation flux and rejection for oil/water seed solution was tested at different pressures under stirring conditions. FIG. 4 shows that the pure water flux of cellulose membrane increased with increasing pressure. It is also noted that the flux dramatically depends on the thickness of the top layer—thinner cellulose layers provided higher flux values. This result was confirmed further by the filtration of oily water at 15 psi (FIG. 5). The permeation flux decreased with increasing cellulose layer thickness, while the percent rejection remained roughly constant.

Example 8

Cellulose Membranes Coated at Different Concentrations of the Coating Solution

Figure 6:
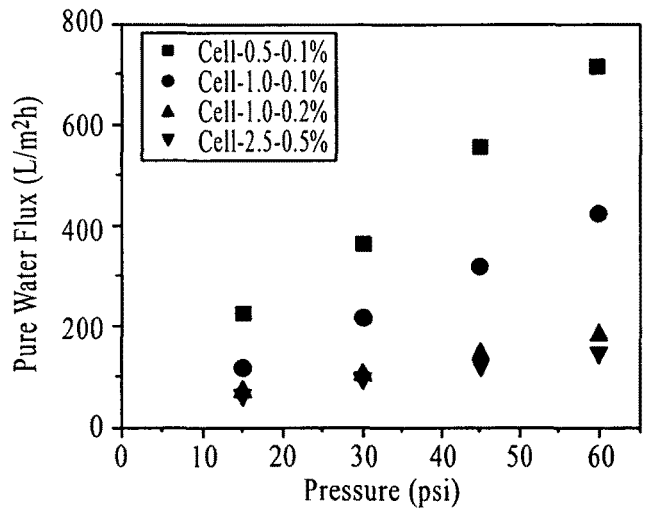
FIG. 6 shows the pure water flux for cellulose/e-spun PAN composite membranes at different pressures for membranes, prepared from different cellulose solution concentrations.

The effects of different coating solution concentrations in the preparation of cellulose membranes was evaluated. Pure water flux and oil/water filtration measurements were performed using a dead-end cell at different pressures. As shown in FIG. 6, the concentration of the coating solution affected the pure water flux. Membranes prepared from the low concentration cellulose solutions had a higher water flux even when the apparent thickness of the top layer was the same as that of membranes prepared using more concentrated cellulose solutions. Membranes prepared from higher concentration cellulose solutions exhibited less sensitivity of the flux to changes in pressure and apparent cellulose layer thickness.

Figure 7:
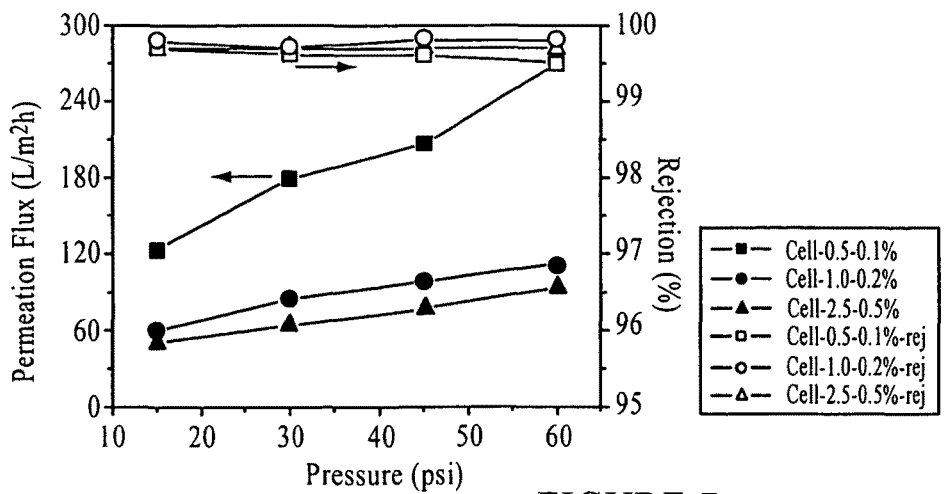
FIG. 7 shows the permeation flux and % rejection for cellulose/e-spun PAN composite membranes evaluated with an oil/water emulsion.

These membranes also exhibited a high rejection rate and relative insensitivity to changes in pressure when evaluated with emulsified oil/water solutions (FIG. 7).

Example 9

Evaluation of MWCO of Cellulose Membranes

Figure 8:
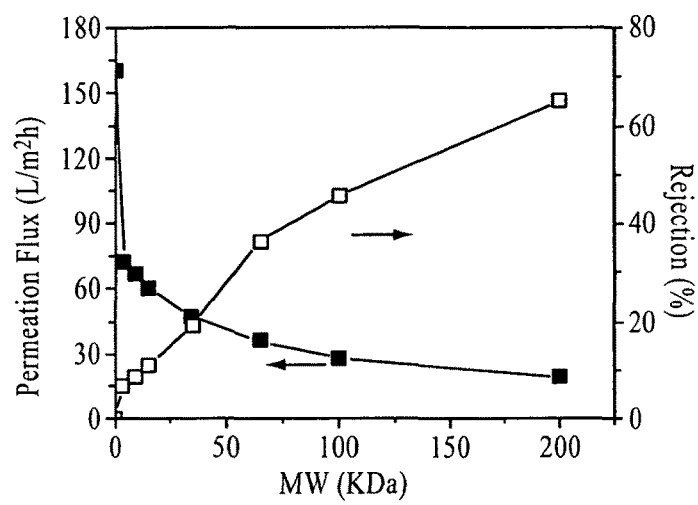
FIG. 8 shows the permeation flux and % rejection for cellulose/e-spun PAN composite membranes as a function of MWCO. The thickness of the cellulose layer is 0.5 μm.

The effect of molecular weight cut-off (MWCO) on % rejection for cellulose membranes on a PAN e-spun porous support was evaluated using the procedure described in Example 6. When the MWCO of a membrane having a 0.5 µm coating layer thickness is above 60K, the rejection is higher than 40% as measured by the TOC result. When the molecular weight of dextran is higher than 200K, the % rejection becomes nearer to 70% (FIG. 8).

Figure 9:
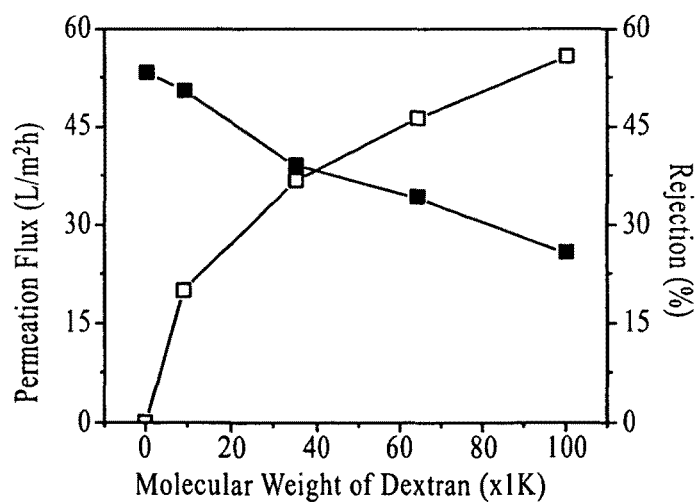
FIG. 9 shows the permeation flux and % rejection for cellulose/e-spun PAN composite membranes as a function of MWCO. The thickness of the cellulose layer is 1.0 μm.

Cellulose membranes prepared from a 0.2% concentration of cellulose coating solution, and having a cellulose layer thickness of 1.0 µm showed a % rejection that was a little higher than that of the thinner membrane (0.5 µm), but the flux was also somewhat lower (FIG. 9).

Example 10

Cellulose Membranes Fabricated by 1-ethyl-3-methylimidazolium Acetate (EAc)

Figure 10:
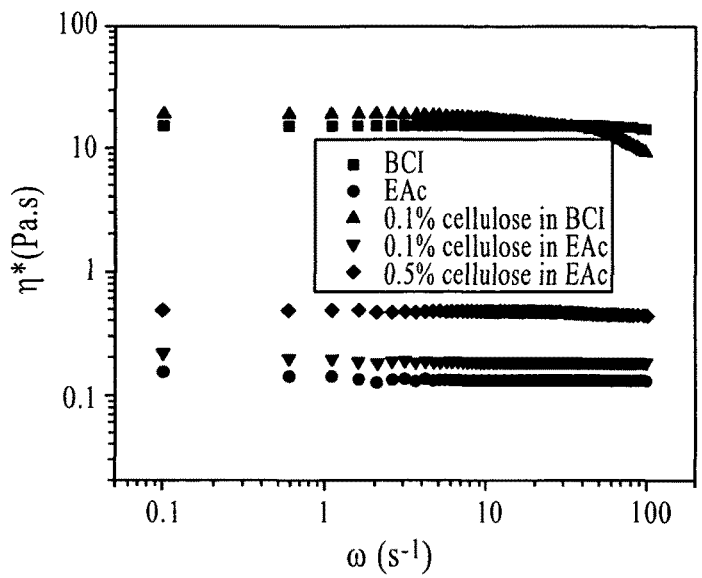
FIG. 10 shows the viscosities for BCl and EAc and various cellulose solutions in these solvents.

Cellulose 620 was dissolved in 1-ethyl-3-methylimidazolium acetate (EAc), and cellulose membranes similar to those described previously in Example 4 were prepared. FIG. 10 shows the viscosities of two ionic liquids and various cellulose coating solutions prepared using these ionic liquids. The viscosity of EAc is about 100 times lower than that of BCl. EAc and BCl solutions with a 0.1% cellulose concentration maintain the same difference in viscosities. For a cellulose solution of EAc with 0.5% cellulose concentration, the viscosity was much lower than that of pure BCl.

Figure 11:
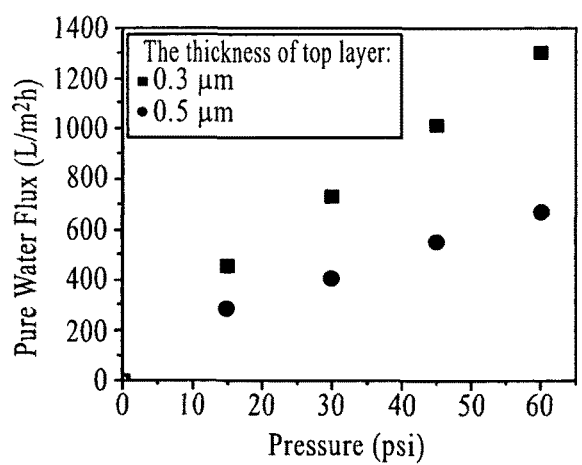
FIG. 11 shows the pure water flux for cellulose/e-spun PAN composite membranes prepared from solutions of cellulose in EAc as a function of pressure.
Figure 12:
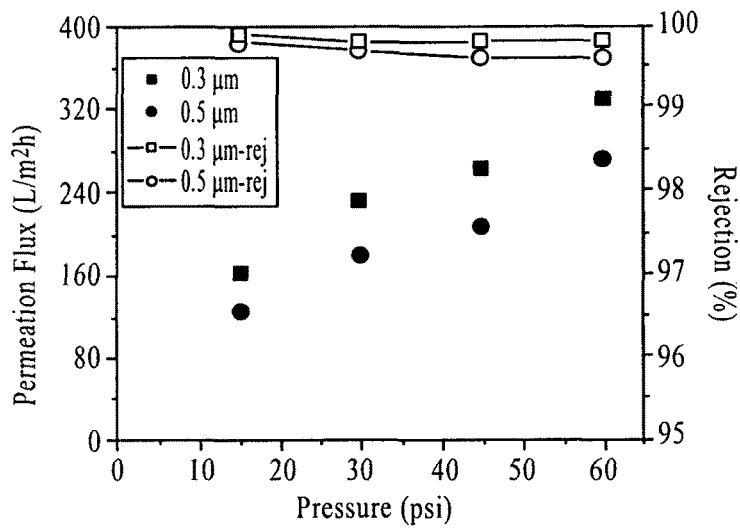
FIG. 12 shows the permeation flux and % rejection for cellulose/e-spun PAN composite membranes as a function of pressure, evaluated with an oil/water emulsion.
Figure 13:
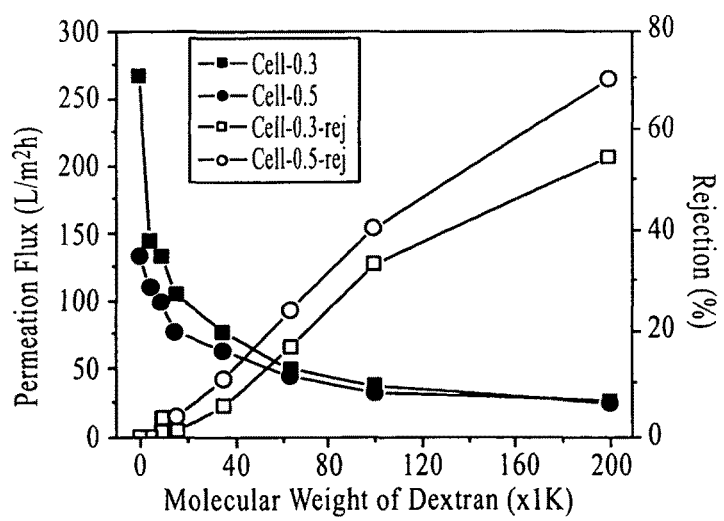
FIG. 13 shows the permeate flux and percent injection as a function of MWCO for cellulose/e-spun PAN composite membranes prepared using EAc solutions of cellulose.

To evaluate whether it was feasible to coat thinner membranes in EAc to increase the flux, a series of cellulose membranes were prepared and tested for pure water flux (FIG. 11), permeation flux and % rejection of oil/water (FIG. 12). FIG. 11 shows that the pure water flux increased with decreasing thickness of the top layer. The permeation flux of cellulose membranes with a thinner cellulose layer was much higher than that of the thicker one, while maintaining good rejection (FIG. 12). The permeate flux and rejection as a function of MWCO is shown in FIG. 13. The MWCO of cellulose membranes fabricated by EAc was above 100K. The rejection was found to be above 70% for dextran with 200K molecular weight.

Example 11

Cellulose Membranes Bases on PA E-Spun Membranes

Figure 14:
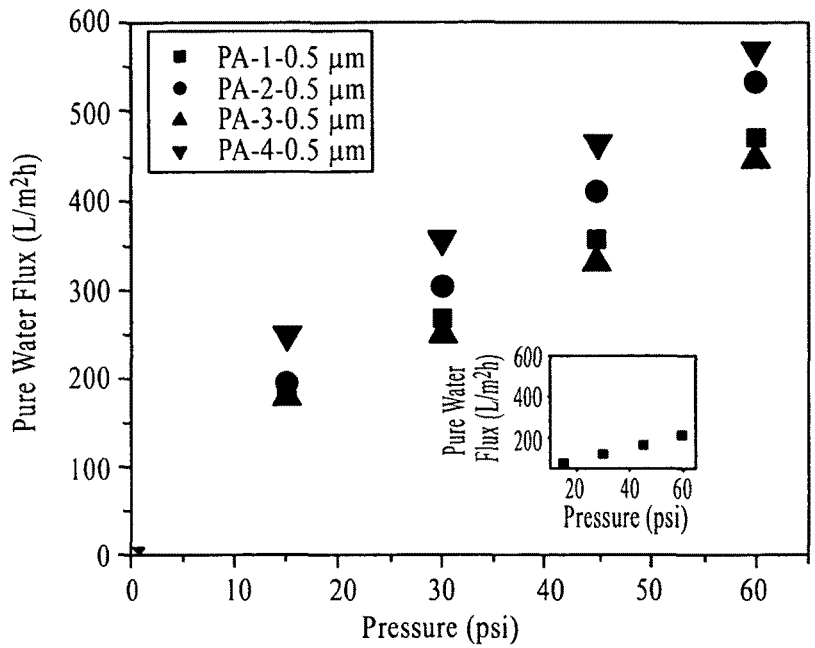
FIG. 14 shows the pure water flux for cellulose/PA e-spun composite membranes (PA-1, PA-2, PA-3, and PA-4) with 0.5 μm cellulose layers (insert—comparison with PAN10).
Figure 15:
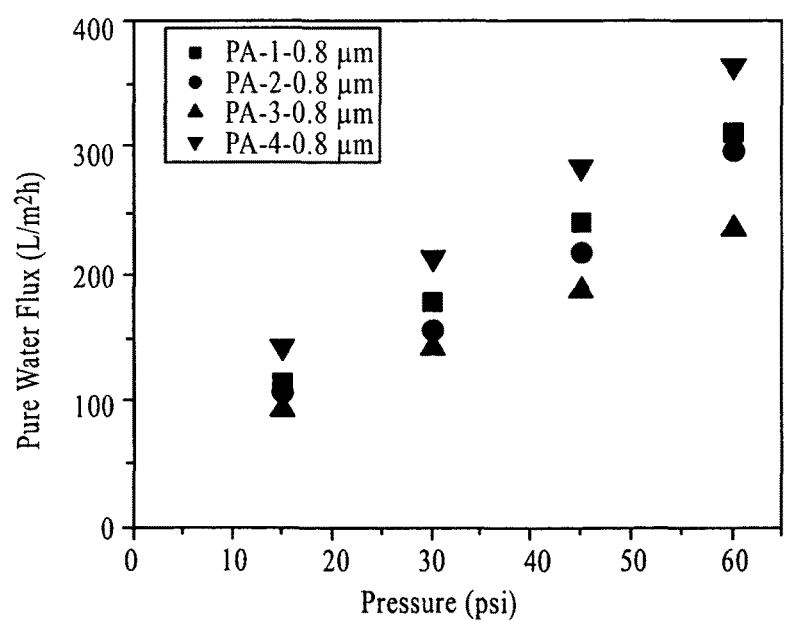
FIG. 15 shows the pure water flux for cellulose/PA e-spun composite membranes (PA-1, PA-2, PA-3, and PA-4) with 0.8 μm cellulose coatings.

A series of cellulose membranes with different cellulose layer thicknesses on a PA e-spun support were prepared following the same procedure as described in Example 4. FIGS. 14 and 15 show the effects of increasing pressure on pure water flux. Very high water flux could be achieved at relatively low pressures (e.g., 15 psi) for PA cellulose coated membranes. Specifically, these membranes with PA-4 and PA-2 supports showed higher flux when compared to PA-1 and PA-3.

Figure 16:
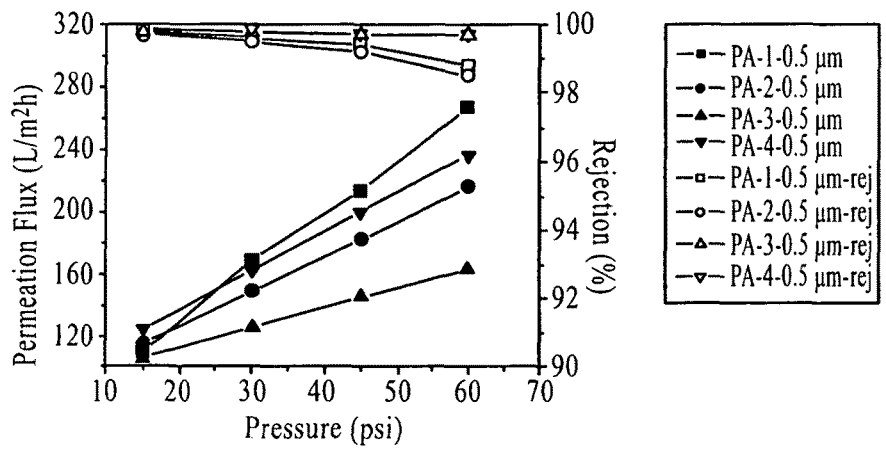
FIG. 16 shows the permeation flux and % rejection for cellulose/PA e-spun composite membranes (PA-1, PA-2, PA-3, and PA-4) with 0.5 μm cellulose coatings, evaluated with an oil/water emulsion.
Figure 17:
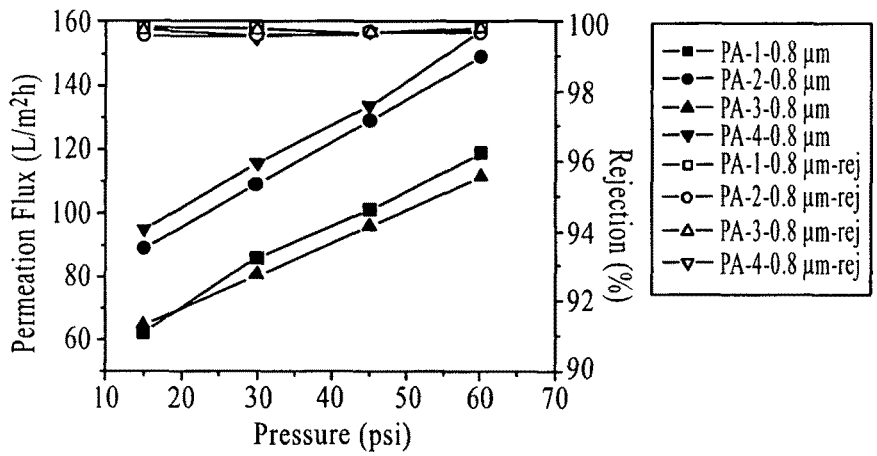
FIG. 17 shows the permeation flux and % rejection for cellulose/PA e-spun composite membranes (PA-1, PA-2, PA-3, and PA-4) with 0.8 μm cellulose coatings, evaluated with an oil/water emulsion.

These membranes were further evaluated using emulsified oil/water solutions (FIGS. 16 and 17). Under these conditions, the permeation flux increased with increasing pressure while maintaining a good rejection percentage. The thickness of the top coating layer affected the flux as well as the % rejection. In general, a thinner top layer correlated with elevated flux. Furthermore, higher flux and similar % rejection was observed for membranes having a PA-4 or PA-2 porous support, compared to otherwise identical membranes having a PA-1 or PA-3 support. It was also found that there was little decrease in % rejection as a function of pressure for cellulose membranes with a thinner cellulose top layer (0.5 µm). However, the % rejection for membranes with thicker cellulose top layers (0.8 µm) remained unchanged over the applied pressure range.

Figure 18:
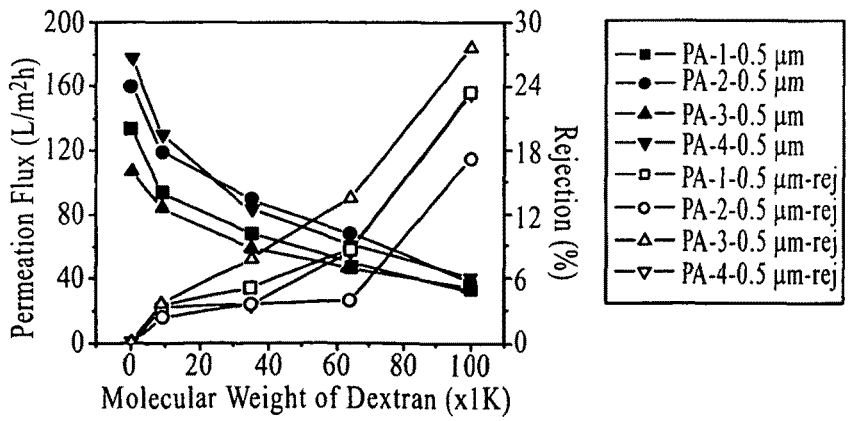
FIG. 18 shows the permeation flux and % rejection of 0.5 μm cellulose/PA e-spun composite membranes (PA-1, PA-2, PA-3, and PA-4) as a function of MWCO.
Figure 19:
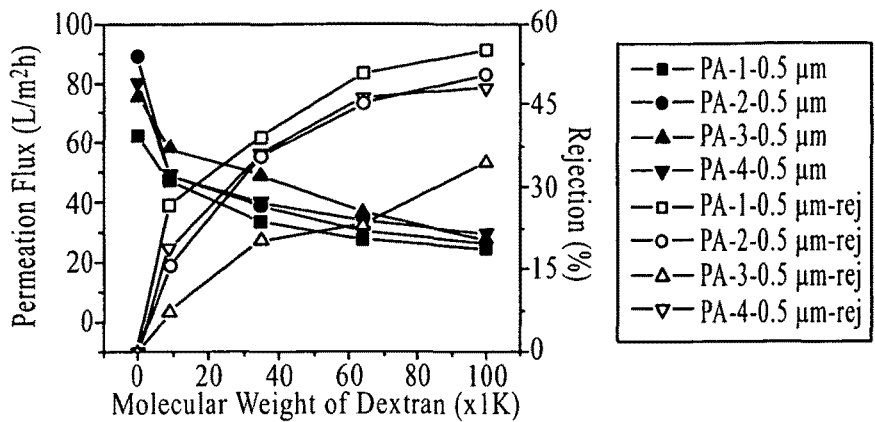
FIG. 19 shows the permeation flux and % rejection of 0.8 μm cellulose/PA e-spun composite membranes (PA-1, PA-2, PA-3, and PA-4) as a function of MWCO.

The permeation flux decreased gradually with increasing molecular weight of Dextran in the seed solution, when the MWCO of all membranes was above 60K. Among those membranes, PA-4 was better, since it had a higher % rejection than the other membranes while retaining a higher permeation flux (FIGS. 18 and 19).

Example 12

Cellulose Membranes Based on Nylon-6 E-Spun Membranes

A nylon-6 e-spun porous support was employed and a series of cellulose membranes with different thicknesses of coating, as well as different concentrations of the coating solution were prepared. The effect of cellulose concentration in coating a porous support of nylon-6 was evaluated for the parameters of water flux, permeation and rejection %. Since the nylon e-spun membrane has poor morphology and many large sized pores, the optimized concentration of cellulose solution utilized was 0.5%, and the membrane was evaluated at a much lower pressure (3 psi). The results can be found in Table 2.

TABLE 2

Pure Water Flux, Permeation Flux, % Rejection for Oil/Water Emulsion Filtration for Cellulose/Nylon-6 E-Spun Support Composite Membranes.

| The thickness of top layer (µm) | Pure water Flux (L/m²h) | Oily water permeation flux (L/m²h) | Rejection (%) |
|---|---|---|---|
| 0.5 (0.1%)* | 374 | 107 | 90.0 |
| 0.8 (0.1%) | 142 | 89 | 97.0 |
| 1.0 (0.2%) | 125 | 51 | 98.0 |
| 1.5 (0.2%) | 80 | 36 | 99.1 |
| 2.5 (0.5%) | 62 | 45 | 99.7 |

*The value in parenthesis is the concentration of the cellulose solution.

Example 13

Cellulose Membranes Based on Cross-Linking PVA E-Spun Membranes

Figure 20:
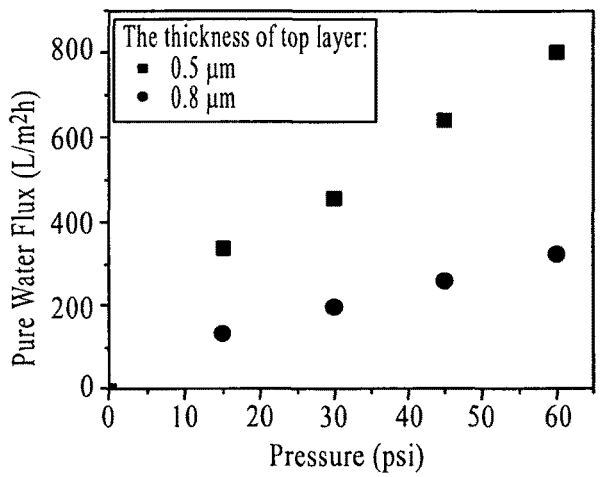
FIG. 20 shows the pure water flux for cellulose/cross-linked PVA e-spun composite membranes.
Figure 21:
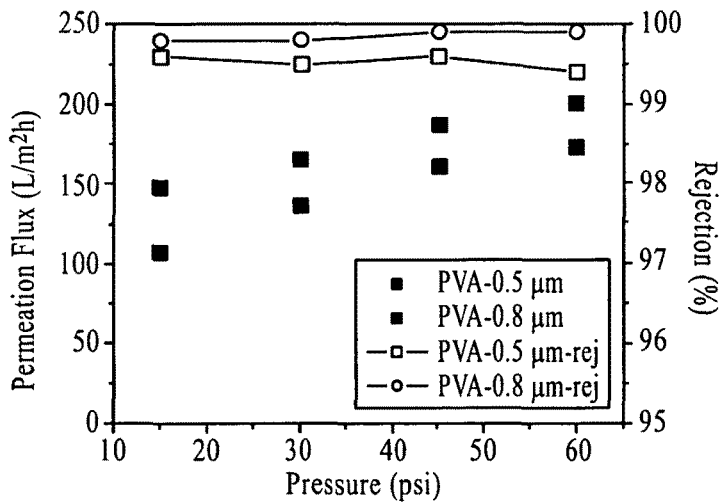
FIG. 21 shows the permeation flux and % rejection for cellulose/cross-linked PVA e-spun composite membranes evaluated with an oil/water emulsion.

A PVA e-spun porous support was employed and a series of cellulose membranes with different thicknesses of coating, as well as different concentrations of the coating solution were prepared. The effect of the cellulose concentration in the cellulose coating solution on the membrane properties (i.e., water flux, permeation and rejection %) was evaluated (FIGS. 20 and 21). It was observed that the pure water flux was much higher than the commercial membrane PAN-10 as shown previously in FIGS. 14 and 15. However, for the oil/water filtration of cellulose membrane with 0.5 µm of the coating layer, the % rejection was a little lower, but still higher than 99.5%.

Example 14

Cellulose Membranes Based on PES E-Spun Supports

A PES e-spun porous support was employed and a series of cellulose membranes with different thicknesses of coating, as well as different concentrations of the coating solution were prepared. The effect of cellulose concentration in the coating on a porous support of PES was evaluated for the parameters of pure water flux (FIG. 22), permeation and rejection % (FIG. 23).

Figure 22:
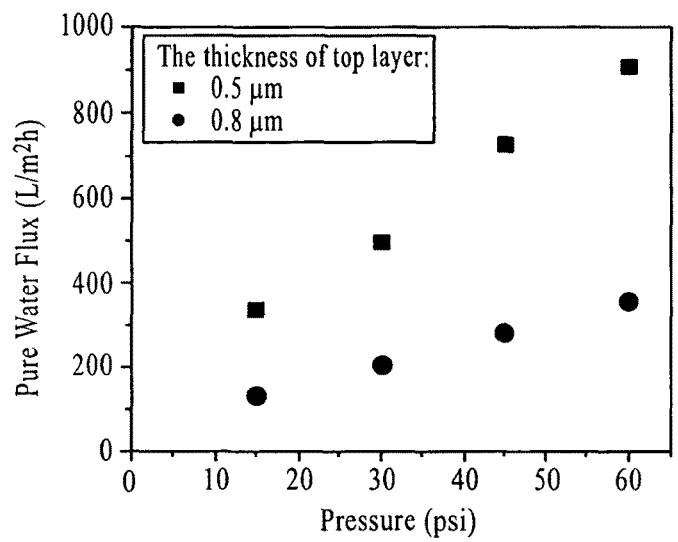
FIG. 22 shows the pure water flux for a cellulose/PES e-spun composite membrane.
Figure 23:
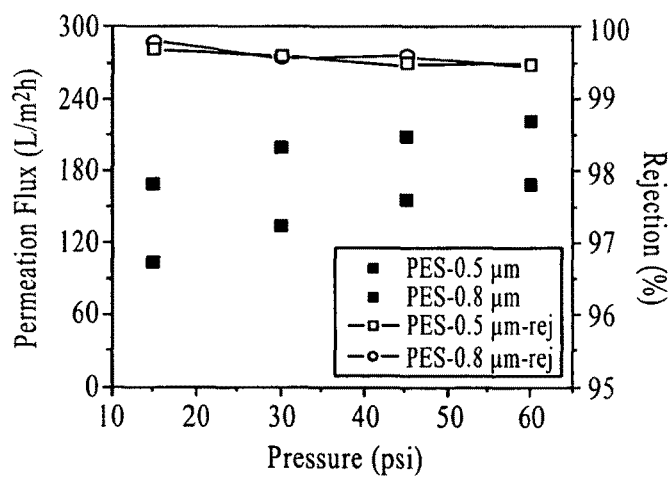
FIG. 23 shows the permeation flux and % rejection for a cellulose/PES e-spun composite membrane evaluated with oil/water emulsion.

As seen in FIG. 22, the pure water flux was much higher than previously observed for membranes employing other supports. When evaluated in a cross-flow cell using an oil/water emulsion, the percent rejection was found higher than 99.5% (FIG. 23).

Example 15

Cellulose Membranes Based on PSF E-Spun Supports

Figure 24:
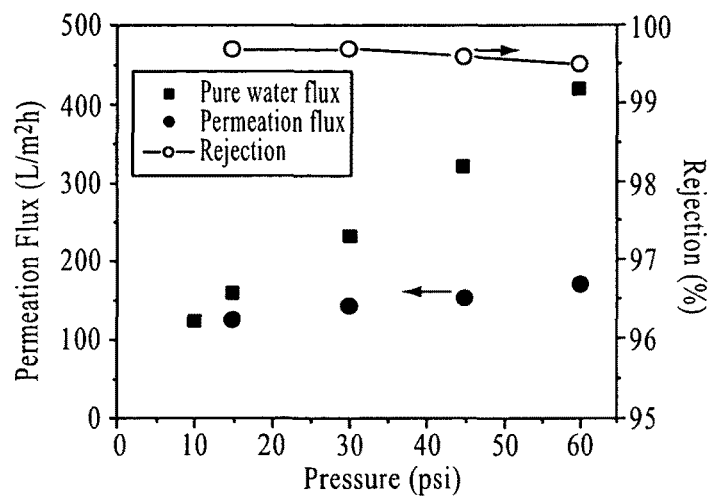
FIG. 24 shows the pure water flux for a cellulose/PSF e-spun composite membrane, as well as the permeation flux and % rejection evaluated with an oil/water emulsion. The thickness of the top layer was 0.5 μm.

A PSF e-spun porous support was employed and a series of cellulose membranes with different thicknesses of coating, as well as different concentrations of the coating solution were prepared. The effects of cellulose concentration during coating onto the porous PSF support was evaluated (e.g., water flux, permeation and % rejection). Even though PSF is a very hydrophobic material, the pure water flux of the nanofibrous composite membrane was still found to be very high. As shown in FIG. 24, the % rejection for an oil/water separation was above 99.5%.

Example 16

Figure 25:
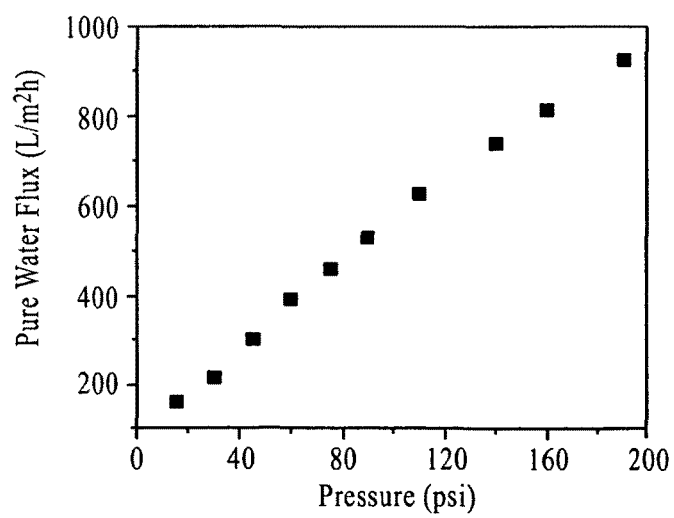
FIG. 25 shows pure water flux vs. pressure for a cellulose/PAN e-spun composite membrane using a cross-flow filtration system. The thickness of the top layer is 0.5 μm.
Figure 26:
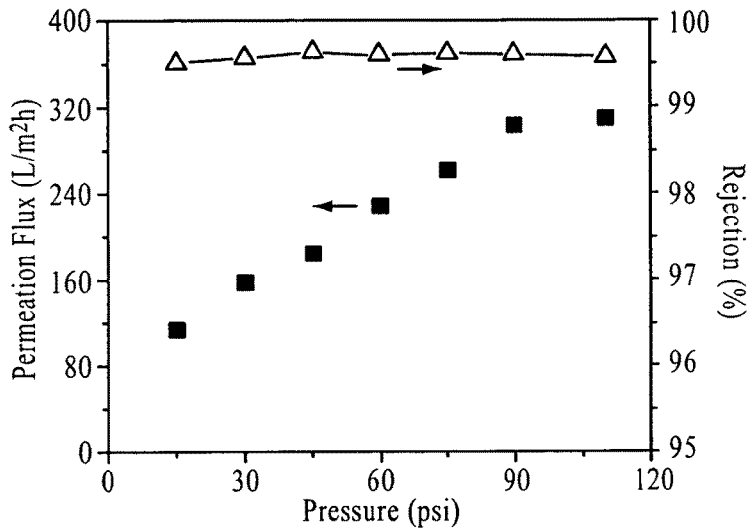
FIG. 26 shows the permeation flux and % rejection for cellulose/PAN e-spun composite membrane, evaluated with an oil/water emulsion using a cross-flow filtration system. The thickness of the top layer of the membrane is 0.5 μm.

Filtration Performance of Cellulose Membranes Based on PAN E-Spun Support with Cross-Flow Filtration Set-Up Further evaluation of the effects of pressure on the flux rate of cellulose coated nanofibrous membranes (prepared as described above, in Example 4), was carried out using a custom-built cross-flow filtration set-up to measure the flux of pure water. As shown in FIG. 25, the pure water flux increased rapidly with pressure. When evaluated using an emulsified oil/water mixture, the permeate flux of these membranes increased continuously with increasing pressure while maintaining the rejection rate above 99.5% (FIG. 26).

Figure 27:
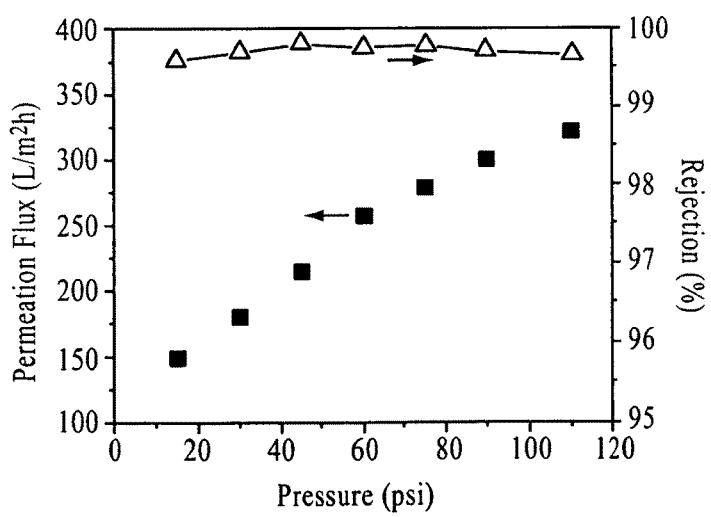
FIG. 27 shows the permeation flux and % rejection for cellulose/PAN e-spun composite membranes using a cross-flow filtration system (cellulose D=7350) evaluated with an oil/water emulsion. The thickness of the top layer of the membrane is 0.5 μm.

To evaluate the effect of using different types of cellulose, membranes prepared from cellulose having a degree of polymerization (DP) of 7350 were prepared. Measurements of permeation flux and % rejection were carried out using an oil/water emulsions and a cross-flow cell. FIG. 27 shows trends similar to those for membranes coated with cellulose having a DP of 620 (using the same PAN support and at the same cellulose coating thickness as for cellulose coatings with a DP of 7350) (FIG. 26).

In summary, the fluxes and % rejection of membranes with cellulose coatings having different cellulose DP values were found to be similar to each other. Accordingly, it appears that the molecular weight of cellulose has little effect on membrane performance when evaluated with oil/water emulsions.

Example 17

Stability and Reusability of Cellulose Membrane

Figure 28:
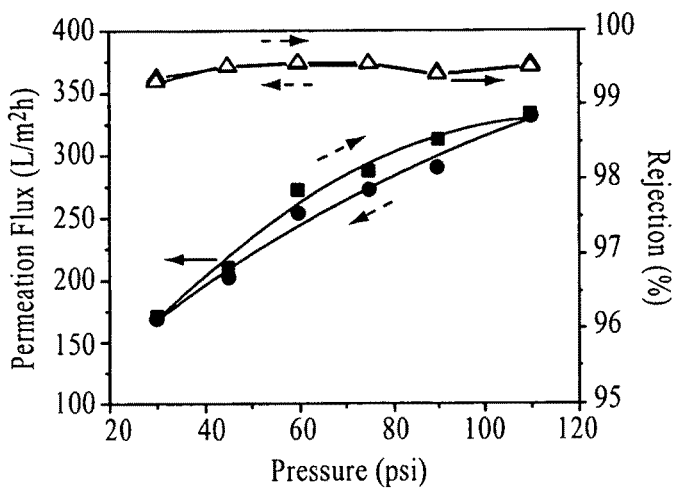
FIG. 28 shows the permeation flux and % rejection for a cellulose/PAN e-spun membrane for oil/water filtration in which the pressure was cycled from 30-110 psi. The thickness of the top layer of the membrane is 0.5 μm.

To test the long term stability and reusability of cellulose membranes (e-spun PAN support, ~0.5 µm cellulose coating, cellulose DP 620), the parameters of separation efficiency, including flux and % rejection of cellulose membranes for oily water, were evaluated under varying pressure conditions which was increased from 30 psi to 110 psi, and then, decreased back to the original pressure. FIG. 28 shows that the % rejection remained essentially the same, while the permeation flux decreased only slightly over the pressure cycle. Furthermore, over multiple pressure cycles, the permeation flux remained essentially unchanged, indicating that the cellulose membranes of the present invention are robust over simulated use conditions.

Example 18

Fouling of Cellulose Membrane for Filtration of Oil/Water Emulsions

Figure 29:
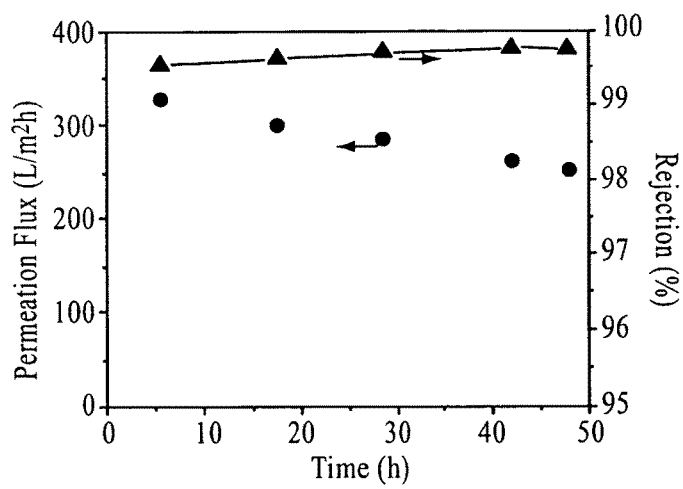
FIG. 29 shows the permeation flux and % rejection for a cellulose membrane during 48 hours of oil/water emulsion filtration. The thickness of the top layer of the membrane is 0.5 μm.

To monitor fouling of a cellulose membrane (e-spun PAN support, ~0.5 µm cellulose coating, cellulose DP 620) over time, the permeation flux and % rejection were evaluated using oil/water emulsions at a constant pressure of 90 psi. FIG. 29 shows that the flux decreased slowly during the filtration process because of the fouling of oil on the surface of the membrane. On the other hand, the rejection rate increased slightly over the same experimental conditions.

Example 19

Fouling of Cellulose Membrane for Filtration of Sodium Alginate

Figure 30:
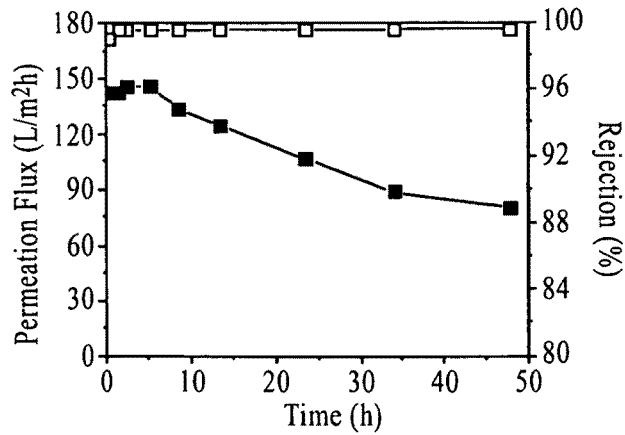
FIG. 30 shows the permeation flux and % rejection for a cellulose/PAN e-spun membrane during 48 hours of sodium alginate filtration. The thickness of the top layer of the membrane is 0.5 μm.

To evaluate the fouling of a cellulose membrane (e-spun PAN support, ~0.5 µm cellulose coating, cellulose DP 620) over time, the permeation flux and % rejection were evaluated using sodium alginate (500 ppm, 80-120K) in water over a 48 hour period. FIG. 30 shows that the permeation flux decreased with time, while the percent rejection remained unchanged, and was found to be higher than 99.6%.

Example 20

Recycle and Reuse of Ionic Liquids

Figure 31:
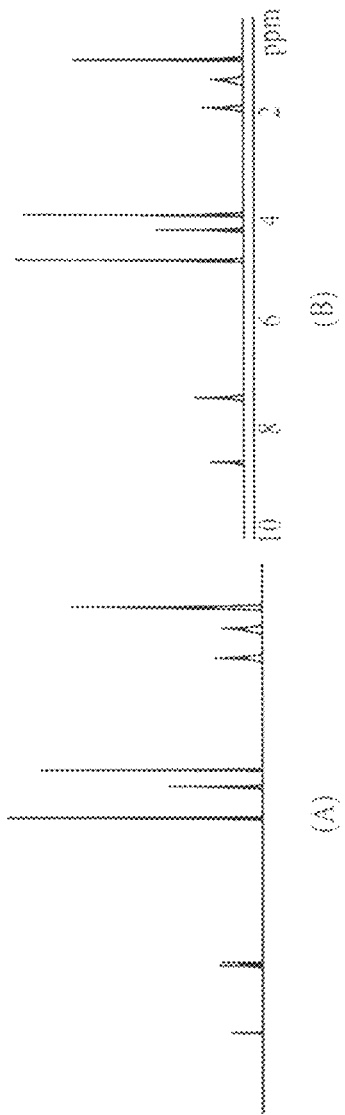
FIG. 31 shows the $^1$H NMR spectra of ionic liquids before use (A) and after recycling (B).

The effect of recycling an ionic liquid on the experimental parameters of permeation flux and rejection rate was evaluated. The ionic liquid BCl was recycled by distillation from ethanol solution and subsequent drying at 90° C. for 24 hours under reduced pressure. The purity of the recycled BCl was measured using $^1$H NMR. As shown in FIG. 31B, the $^1$H NMR of the recycled BCl shows that the recycled BCl is essentially the same as the $^1$H NMR before use (FIG. 31A), indicating that recycled BCl can be easily recycled.

Example 21

Cross-Section of Cellulose Coating on PAN E-Spun Membrane

Figure 32:
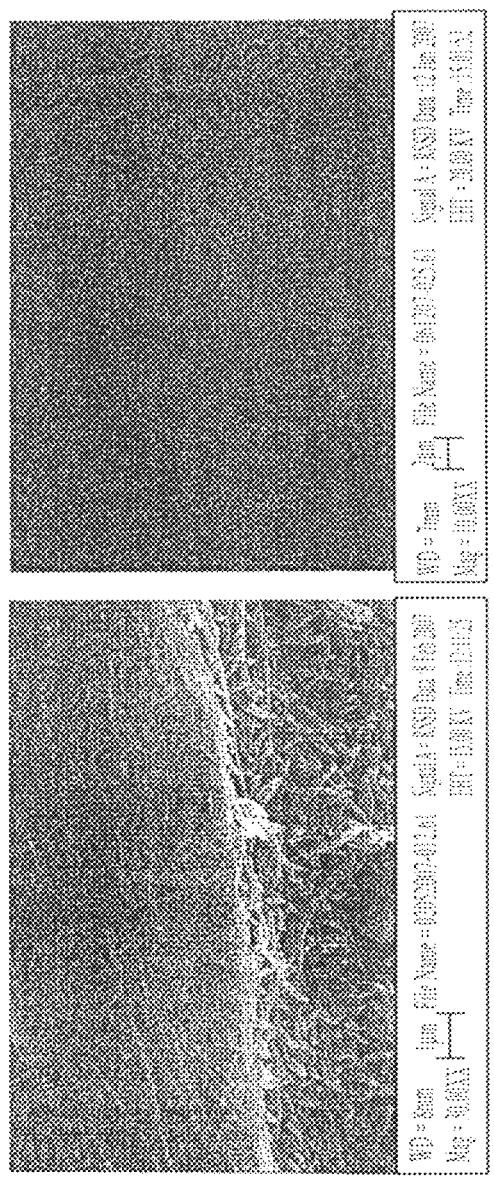
FIG. 32 shows a cross-section and a top view of a cellulose coating on a PAN e-spun membrane.

The thickness of the coating layer as well as the morphology of the surface of the cellulose membrane on a PAN porous support was investigated using SEM (FIG. 32). It was found that the thickness of the coating layer of the membrane was about 0.3-1.0 µm, and the surface was smooth and flat.

Example 22

Comparison of Cellulose Coating on PAN membranes with Commercial Membranes

Figure 33:
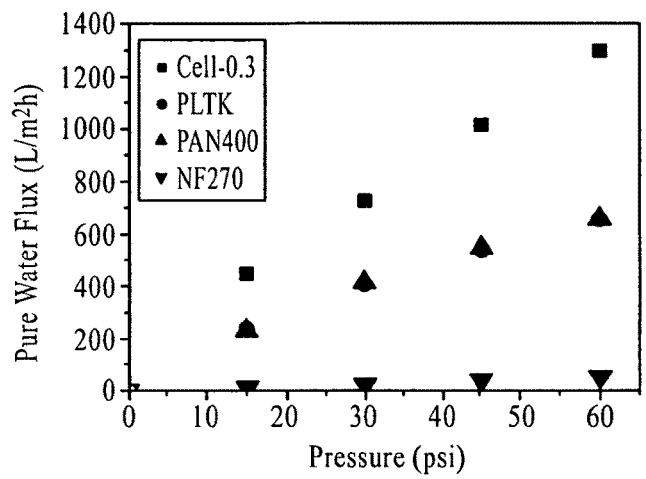
FIG. 33 shows the pure water flux at different pressures for cellulose/PAN e-spun composite membranes (0.5 µm and 1.0 µm coatings) compared with commercial NF270, PTLK, and PAN400 membranes at 15 psi.

FIG. 33 compares the pure water flux of the cellulose nanofibrous membrane comprising a cellulose layer thickness of 0.5 µm, coated onto a PAN e-spun support (~40-50 µm of thickness) with commercial Dow NF270, Sepro PAN 400 and Millipore PLTK membranes. The cellulose nanofibrous membrane with the 0.3 µm cellulose layer had a pure water flux about 30 times higher than the NF270 membrane, and 2 times higher than that of the PAN 400 and PLTK membranes.

Figure 34:
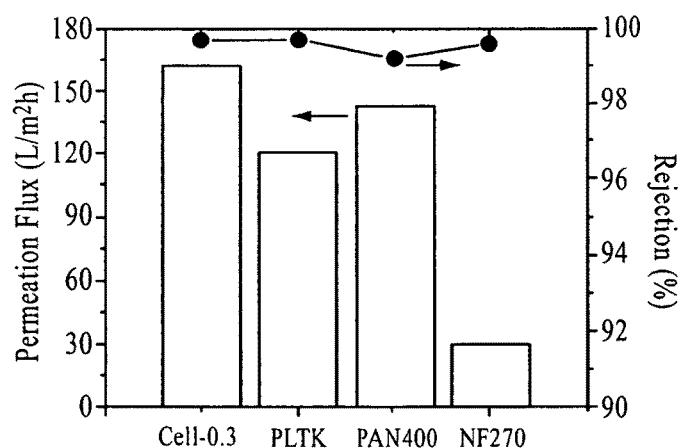
FIG. 34 shows the permeation flux and % rejection for cellulose/PAN e-spun composite membranes (0.5 µm and 1.0 µm coatings) compared with commercial NF270, PTLK, and PAN400 membranes, evaluated with an oil/water emulsion.

The flux and rejection performance of these membranes was also evaluated with an oil-water emulsion using a dead-end nanofiltration cell, at 15 psi. As shown in FIG. 34, the cellulose nanofibers membrane with the 0.3 g cellulose layer had a permeation flux approximately 5 times higher than for the NF270 membrane, while providing a comparable rejection.

Example 23

Preparation of Cellulose Membrane with Continuous Knife Coating System

Figure 35:
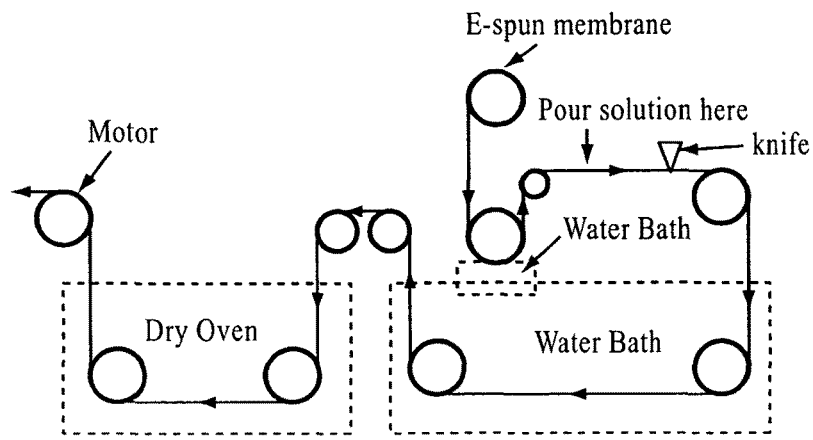
FIG. 35 shows a schematic of the preparation of cellulose membranes with a continuous knife coating system.

The cellulose membrane can also be prepared using a continuous process, e.g., using a knife coating system. A schematic of the process is shown in FIG. 35.

Figure 36:
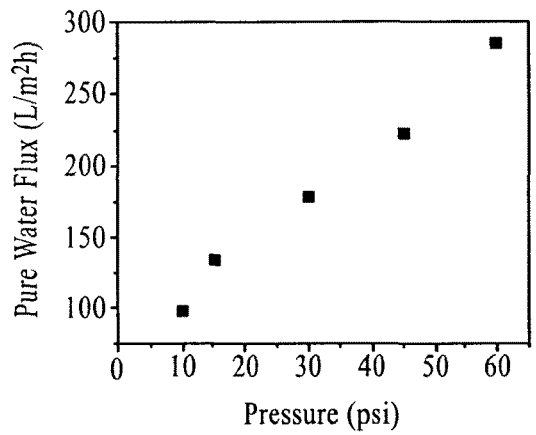
FIG. 36 shows the pure water flux at different pressures for cellulose/PAN e-spun composite membranes (0.5 µm coating) prepared with knife coating system.
Figure 37:
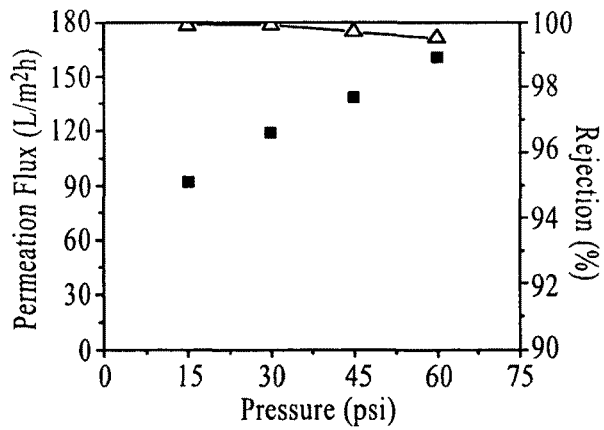
FIG. 37 shows the permeation flux and % rejection at different pressures for cellulose/PAN e-spun composite membranes (0.5 µm coating) prepared with knife coating system in oil-water filtration.

5 meters of a PA e-spun support was coated with a 1.0 (w/w) % cellulose solution in EAc. The thickness of the top layer was about 0.5 µm. These cellulose membranes were evaluated for pure water flux, and permeation flux and rejection using an oil-water emulsion with a dead-end cell. The results are shown in FIGS. 36 and 37.

Again, high pure water fluxes were observed, and the permeation flux increased with increasing pressure. The rejection was high at 15 psi and decreased little at 60 psi, while maintaining a rejection higher than 99.5%.

Example 24

Thermal Stability of Cellulose Membranes

Figure 38:
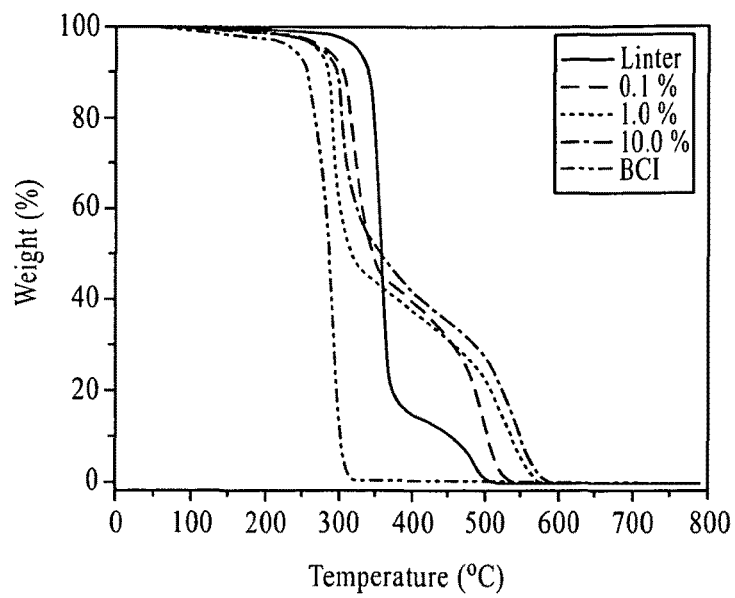
FIG. 38 shows the thermal stabilities of cellulose membranes prepared with different concentration of cellulose solutions.

Thermal Stability. The thermal stability of cotton linter, BCl, and the cellulose membranes prepared with different concentration cellulose solutions were investigated by TGA as shown in FIG. 38.

The onset of decomposition for of all the membranes was lower than that of the cotton linter, about 275~285 vs. 326.9° C., respectively, and shows a first stage decomposition of about 5%. The difference in thermal stability properties may depend on the presence of two different crystal types of celluloses.

At the second stage of decomposition, there is only 18% of cotton linter remaining at 369.2° C., which means that about 77% of the cotton linter decomposed within 34° C. For the membranes, only about 40-50% decomposed within 30° C. at the second stage.

The cotton linter decomposed completely at 506.0° C., whereas the membrane decomposed completely above 580° C. The decomposition of BCl is began at 245.0° C., and was complete at 307.3° C. Since the decomposition of the BCl is quite different from that of both celluloses, there did not appear to be any residual ionic liquid (BCl) in the membrane.

Example 25

WAXD of Cellulose Membranes

Figure 39:
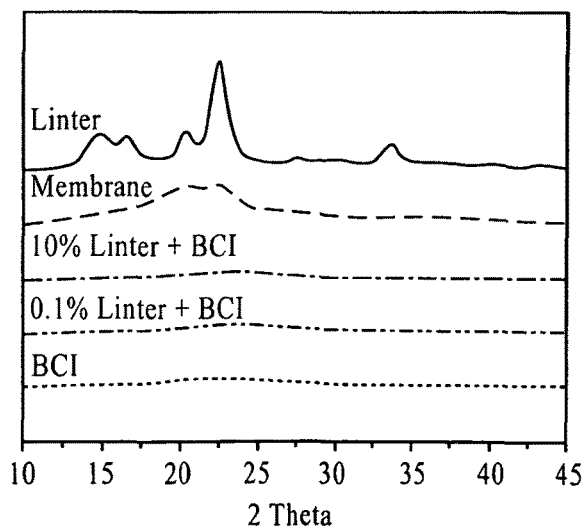
FIG. 39 shows the WAXD of cotton linter, cellulose membrane (prepared with 10 (w/w) % cellulose solution), BCl, 0.1%, and 10% cellulose in BCl.

To further understand the change in the structure of the membrane, WAXD of the cellulose membrane (prepared with 10 (w/w) % of cellulose solution), as well as the cotton linter was performed. FIG. 39 illustrated the ID WAXD curve. The diffraction crystalline peaks of the membrane are quite different from that of the cotton linter indicated that there was a substantial difference in the structure of the cellulose membrane compared to the cotton linter. The crystal type of the cotton linter is cellulose I, and may have changed into other type of cellulose crystal type after treatment with the ionic liquid. Furthermore, the crystallinities of the two materials (cotton linter and cellulose coating) are also different. The crystallinity of the cotton linter is 70.93%, while that of the cellulose coating on the membrane is 38.25%, as calculated from WAXD data.

We claim:

1. A membrane comprising:
   (a) a coating layer having a thickness from about 0.1 to about 1 µm comprising cellulose or a cellulose derivative;
   (b) a porous support layer comprising nanofibers having a core-shell structure, the core and shell formed of different polymers;
   wherein the membrane is prepared by a process comprising coating a solution comprising cellulose or a cellulose derivative dissolved in an ionic liquid onto the porous support layer, and removing the ionic liquid, thereby forming the coating layer, and
   wherein the porous support layer further comprises a plurality of layers each comprising nanofibers, and wherein the average diameter of the nanofibers in the layer contacting the coating layer is less than the average diameter of the nanofibers disposed below the layer contacting the coating layer.

2. The membrane of claim 1, wherein the concentration of the cellulose or a cellulose derivative in the ionic liquid is in the range of about 0.002% (w/w) to 10% (w/w).

3. The membrane of claim 1, wherein the coating layer has a thickness from about 0.3 microns to about 1.0 microns, and wherein the concentration of cellulose or cellulose derivative in the ionic liquid is in the range of from about 0.01% (w/w) to about 2.5% (w/w).

4. The membrane of claim 1, wherein the ionic liquids comprise N-alkylimidazolonium cations having the general formula 1-$C_nH_{2n+1}$-3-methylimidazolonium wherein n is an integer from 1-12.

5. The membrane of claim 4, wherein the anion for the N-alkylimidazolonium cation is selected from the group consisting of halogens, perchlorates, pseudohalogens, and carboxylates.

6. The membrane of claim 5, wherein the anion comprises $Cl^-$, or $Br^-$.

7. The membrane of claim 1, wherein the ionic liquid comprises 1-ethyl-3-methylimidazolium acetate or 1-butyl-3-methylimidazolium chloride.

8. The membrane of claim 1, wherein the porous support layer comprising nanofibers has a thickness of about 50 nm to about 50 µm.

9. The membrane of claim 1, wherein the porous support has a thickness of about 5 µm to about 50 µm.

10. The membrane of claim 1, wherein the average diameter of the nanofibers in the layer contacting the coating layer ranges from about 2 nm to about 100 nm, and the average diameter of the nanofibers disposed below the layer contacting the coating layer ranges from about 100 nm to about 2000 nm.

11. The membrane of claim 1, wherein the coating layer has a thickness in the range of about 0.3 to about 0.5 microns, and the thickness of the porous support layer is in the range of about 20 μm to about 50 μm.

12. The membrane of claim 1, wherein the nanofibers comprise a polymer selected from the group consisting of polyolefins, polysulfones, polyethersulfones, fluoropolymers, polyvinylidene fluorides, polyesters, polyamides, polycarbonates, polystyrenes, polyacrylamides, polyacrylates, polyacrylonitriles, poly(meth)acrylates, polyvinyl acetates, polyvinyl alcohols, polysaccharides, chitosan, proteins, polyalkyleneoxides, polyurethanes, polyureas, polyvinyl chlorides, polyimines, polyvinylpyrrolidones, polyacrylic acids, polymethacrylic acids, polysiloxanes, poly(ester-co-glycol) polymers, poly(ether-co-amide) polymers, cross-linked forms thereof, derivatives thereof, and copolymers thereof.

13. The membrane of claim 12, wherein the membrane is an ultrafiltration membrane, a nanofiltration membrane, a reverse osmosis membrane, or a forward osmosis membrane.

14. The membrane of claim 1, wherein the nanofibers comprise polyamide, polyacrylonitrile, polysulfone, polyvinyl alcohol, polyethersulfone, or derivatives thereof.

15. The membrane of claim 1, wherein the porous support further comprises a substrate layer disposed on the surface of the porous support opposite the surface in contact with the cellulose coating.

16. The membrane of claim 15, wherein the substrate layer is either woven or non woven.

17. The membrane of claim 15, wherein the substrate layer comprises poly(ethylene terephthalate).

18. The membrane of claim 1, having a permeation flux for water filtration of about 400 $L/m^2h$ to about 700 $L/m^2h$ at a pressure of about 15 psi, and wherein the coating layer has a thickness of about 0.3 microns.

19. The membrane of claim 1, wherein the thickness of the coating layer is in the range of about 0.3 micron to about 1.0 micron.

20. The membrane of claim 1, wherein the volume of the core of the nanofibers having the core-shell structure occupies from about 1% to about 90% of the total effective volume of the nanofiber.

\* \* \* \* \*